(12) United States Patent
Schwab et al.

(10) Patent No.: US 10,742,305 B2
(45) Date of Patent: Aug. 11, 2020

(54) OUTPUT MUTING ARE ACTIVE REPEATER SYSTEMS

(71) Applicant: CommScope Technologies LLC, Hickory, NC (US)

(72) Inventors: Daniel Schwab, Gersthofen (DE); Kevin Walkup, Forest, VA (US); Gerald Steidle, Buchdorf (DE); Alfons Dussmann, Gansheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/947,685

(22) Filed: Apr. 6, 2018

(65) Prior Publication Data

US 2018/0294867 A1    Oct. 11, 2018

Related U.S. Application Data

(60) Provisional application No. 62/482,747, filed on Apr. 7, 2017.

(51) Int. Cl.
*H04B 7/155* (2006.01)
*H04W 84/04* (2009.01)
*H04B 7/26* (2006.01)

(52) U.S. Cl.
CPC ..... *H04B 7/15507* (2013.01); *H04B 7/15535* (2013.01); *H04B 7/2606* (2013.01); *H04W 84/047* (2013.01)

(58) Field of Classification Search
CPC .................................. H04B 7/15507
See application file for complete search history.

(56) References Cited

U.S. PATENT DOCUMENTS

| | | | |
|---|---|---|---|
| 5,678,221 A * | 10/1997 | Cahill | H04B 1/1027 455/200.1 |
| 2002/0119749 A1 | 8/2002 | Oh et al. | |
| 2007/0190934 A1 | 8/2007 | Kim et al. | |

(Continued)

OTHER PUBLICATIONS

International Searching Authority, "Notification of Transmittal of the International Searching Report and the Written Opinion of the International Searching Authority from PCT Application No. PCT/US2018/026602 dated Aug. 27, 2018", from Foreign Counterpart to U.S. Appl. No. 15/947,685, filed Aug. 27, 2018, pp. 1-15, Published: KR.

*Primary Examiner* — Hsinchun Liao
(74) *Attorney, Agent, or Firm* — Fogg & Powers LLC

(57) ABSTRACT

One embodiment is directed to a repeater system configured for use with a base station that implements a wireless interface that makes use of control transmissions that are retransmittable (for example, LTE PRACH transmissions). The repeater system implements a simplified mute or squelch function that transitions the repeater circuitry from a muted state to an unmuted state in response to a received power level crossing a first threshold value in connection with a first control transmission. Although that first control transmission will be lost, the repeater circuitry is configured to remain in the unmuted state in order to handle a retransmitted control transmission and to handle any associated subsequent control and user transmissions. The repeater system can be implemented as a single-node repeater and/or a distributed antenna system. Other embodiments are disclosed.

42 Claims, 6 Drawing Sheets

(56) References Cited

U.S. PATENT DOCUMENTS

| | | | |
|---|---|---|---|
| 2010/0009625 A1* | 1/2010 | Chami | H04B 7/15535 |
| | | | 455/11.1 |
| 2011/0195660 A1 | 8/2011 | Okada | |
| 2012/0294287 A1* | 11/2012 | Jeong | H04L 5/001 |
| | | | 370/331 |
| 2012/0329523 A1* | 12/2012 | Stewart | H03F 1/3247 |
| | | | 455/562.1 |
| 2015/0055547 A1 | 2/2015 | Licardie et al. | |

* cited by examiner

OUTPUT MUTING ARE ACTIVE REPEATER SYSTEMS

CROSS-REFERENCE TO RELATED APPLICATION

This application claims the benefit of U.S. Provisional Patent Application Ser. No. 62/482,747, filed on Apr. 7, 2017, which is hereby incorporated herein by reference.

BACKGROUND

A repeater system (such as a distributed antenna system (DAS) or a single-node repeater) is typically used to improve the wireless radio frequency (RF) coverage provided by one or more base stations. The wireless service provided by each base station can include commercial cellular service or private or public safety wireless service. The repeater system can be implemented as an "active" system in the sense that the downlink and uplink RF signals are amplified before being repeated.

Active repeater systems can be used, for example, in sport stadiums, buildings (hotels, malls, or trade centers), metro stations and airports, trains, and tunnels. Each base station can be coupled to the repeater system via one or more cables or via a wireless connection, for example, using one or more donor antennas. Repeater systems can be used in other applications.

The capacity of each base station coupled to a repeater system can be dedicated to the repeater system. The capacity of each base station coupled to a repeater system can also be shared among the repeater system and a base station antenna system that is co-located with the base station and/or shared among the repeater system and one or more other repeater systems.

Each active element in each transmit signal path of the repeater system adds noise to the repeated RF signal transmitted from the signal path. Where the capacity of a base station is shared, it is desirable to configure the repeater system to avoid noise contribution at the receiver of the base station resulting from noise added by the active elements of the uplink transmit signal path of the repeater system. If the noise contribution at the receiver of the based station is too high, the receiver can be desensitized. Desensitizing the receiver of the base station can cause severe restrictions to a mobile communication system. For user equipment that is communicating directly with the base station (that is, not using the repeater system), desensitizing the receiver of the base station can result in a limited coverage area of the co-located base station antenna system, dropped connections, or throughput limitation.

Noise contribution at the receiver of the base station can be too high if the path loss (attenuation) between the repeater system and the base station is too low due to short distances between the donor antenna and the co-located base station antenna (for example, low free space loss), low coupling values between the repeater system and the base station (for example, where there is a cable connection between the repeater system and the base station). Noise contribution at the receiver of the based station can be too high if the noise figure (NF) of the repeater system is too high, if gain setting of the repeater system is too high (for example, resulting in amplified noise), or if multiple repeater systems share the capacity of one base station.

To avoid noise contribution at the receiver of the base station, proper repeater system design and configuration is necessary. However, for some use scenarios, avoiding such noise contribution solely by proper repeater system design and configuration may not be possible due to technical and geographical limitations or the need for multiple repeater systems share the capacity of the same base station. In such scenarios, it is helpful to eliminate noise added by the active elements in the uplink signal path of the repeater system by using a "squelch" feature to "mute" the uplink signal path. When the uplink signal path is muted, the repeater system does not transmit a repeated uplink RF signal to the base station or transmits a repeated uplink RF signal at a relatively low amplification level. This can be done when there are no UEs within the coverage area of the repeater system and the repeater system is not needed. This can occur, for example, where a repeater system is deployed in a building that is not occupied during nighttime or where a repeater system is used to improve the coverage of public safety wireless service during emergency situations only.

However, generally, such a squelch feature is implemented using a digital signal processing (DSP) unit that analyzes the uplink signals received from the UEs. This is required to guarantee a response time for switching from a muted state to an unmuted state that is sufficiently fast (for example, within microseconds) to avoid cutting the signal and risking losing connections. Wireless communications standards like Global System for Mobile Communications (GSM) and Terrestrial Trunked Radio (TETRA) are the main driver for such fast response times and hence for costly DSP-based squelch implementations.

SUMMARY

One embodiment is directed to a repeater system for use with a base station that implements a wireless interface that makes use of control transmissions that are retransmittable. The system comprises repeater circuitry configured to, while operating in an unmuted state, output a repeated signal at a first power level. The repeated signal is an amplified version of an original signal received by the repeater system. The repeater circuitry is configured to, while operating in a muted state, one of: output the repeated signal at a power level that is less than the first power level; or not output the repeated signal. The repeater system further comprises a power level detection function configured to determine a received power level of the original signal received by the repeater system. The repeater system is configured to, while the repeater circuitry is operated in the muted state, transition the repeater circuitry to being operated in the unmuted state, in response to the received power level exceeding a first threshold value in connection with a first control transmission. The repeater system is configured to, while the repeater circuitry is operated in the unmuted state with a timer not running, start running the timer and have the repeater circuitry continue to be operated in the unmuted state, in response to the received power level falling below a second threshold value in connection with the completion of the transmission of the first control transmission. The repeater system is configured to, while the repeater circuitry is operated in the unmuted state with the timer running, stop the running of the timer and have the repeater circuitry continue to be operated in the unmuted state, in response to the received power level exceeding the first threshold value in connection with a subsequent control transmission. The repeater system is configured to, while the repeater circuitry is operated in the unmuted state with the timer running, stop the running of the timer and transition the repeater circuitry to being operated in the muted state, in response to the timer having run for a predetermined amount of time without the received power level exceeding the first threshold value.

Another embodiment is directed to a method of muting a repeater system used with a base station that implements a wireless interface that makes use of control transmissions that are retransmittable. The repeater system comprises repeater circuitry configured to, while operating in an unmuted state, output a repeated signal at a first power level. The repeated signal is an amplified version of an original signal received by the repeater system. The repeater circuitry is configured to, while operating in a muted state, do one of: output the repeated signal at a power level that is less than the first power level or not output the repeated signal. The repeater system is configured to determine a received power level of the original signal received by the repeater system. The method comprises, while the repeater circuitry is operated in the muted state, transitioning the repeater circuitry to being operated in the unmuted state, in response to the received power level exceeding a first threshold value in connection with a first control transmission. The method further comprises, while the repeater circuitry is operated in the unmuted state with a timer not running, starting the running of the timer and having the repeater circuitry continue to be operated in the unmuted state, in response to the received power level falling below a second threshold value in connection with the completion of the transmission of the first control transmission. The method further comprises, while the repeater circuitry is operated in the unmuted state with the timer running, stopping the running of the timer and having the repeater circuitry continue to be operated in the unmuted state, in response to the received power level exceeding the first threshold value in connection with a subsequent control transmission. The method further comprises, while the repeater circuitry is operated in the unmuted state with the timer running, stopping the running of the timer and transitioning the repeater circuitry to being operated in the muted state, in response to the timer having run for a predetermined amount of time without the received power level exceeding the first threshold value.

Another embodiment is directed to a repeater system for use with a base station. The system comprises repeater circuitry configured to, while operating in an unmuted state, output a repeated signal at a first power level. The repeated signal is an amplified version of an original signal received by the repeater system. The repeater circuitry is configured to, while operating in a muted state, one of: output the repeated signal at a power level that is less than the first power level or not output the repeated signal. The repeater system further comprises a power level detection function configured to determine a received power level of a signal received by the repeater system. The repeater system is configured to, while the repeater circuitry is operated in the muted state, perform a transition process for operating the repeater circuitry in the unmuted state, in response to the received power level crossing a first threshold value. The repeater system is further configured to, while the repeater circuitry is operated in the unmuted state, perform a transition process for operating the repeater circuitry in the muted state, in response to the received power level crossing a second threshold value.

Another embodiment is directed to a method of muting a repeater system used with a base station. The repeater system comprising repeater circuitry configured to, while operating in an unmuted state, output a repeated signal at a first power level. The repeated signal is an amplified version of an original signal received by the repeater system. The repeater circuitry is configured to, while operating in a muted state, do one of: output the repeated signal at a power level that is less than the first power level or not output the repeated signal. The repeater system is configured to determine a received power level of a signal received by the repeater system. The method comprises, while the repeater circuitry is operated in the muted state, performing a transition process for operating the repeater circuitry in the unmuted state, in response to the received power level crossing a first threshold value. The method further comprises, while the repeater circuitry is operated in the unmuted state, performing a transition process for operating the repeater circuitry in the muted state, in response to the received power level crossing a second threshold value.

Other embodiments are disclosed.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
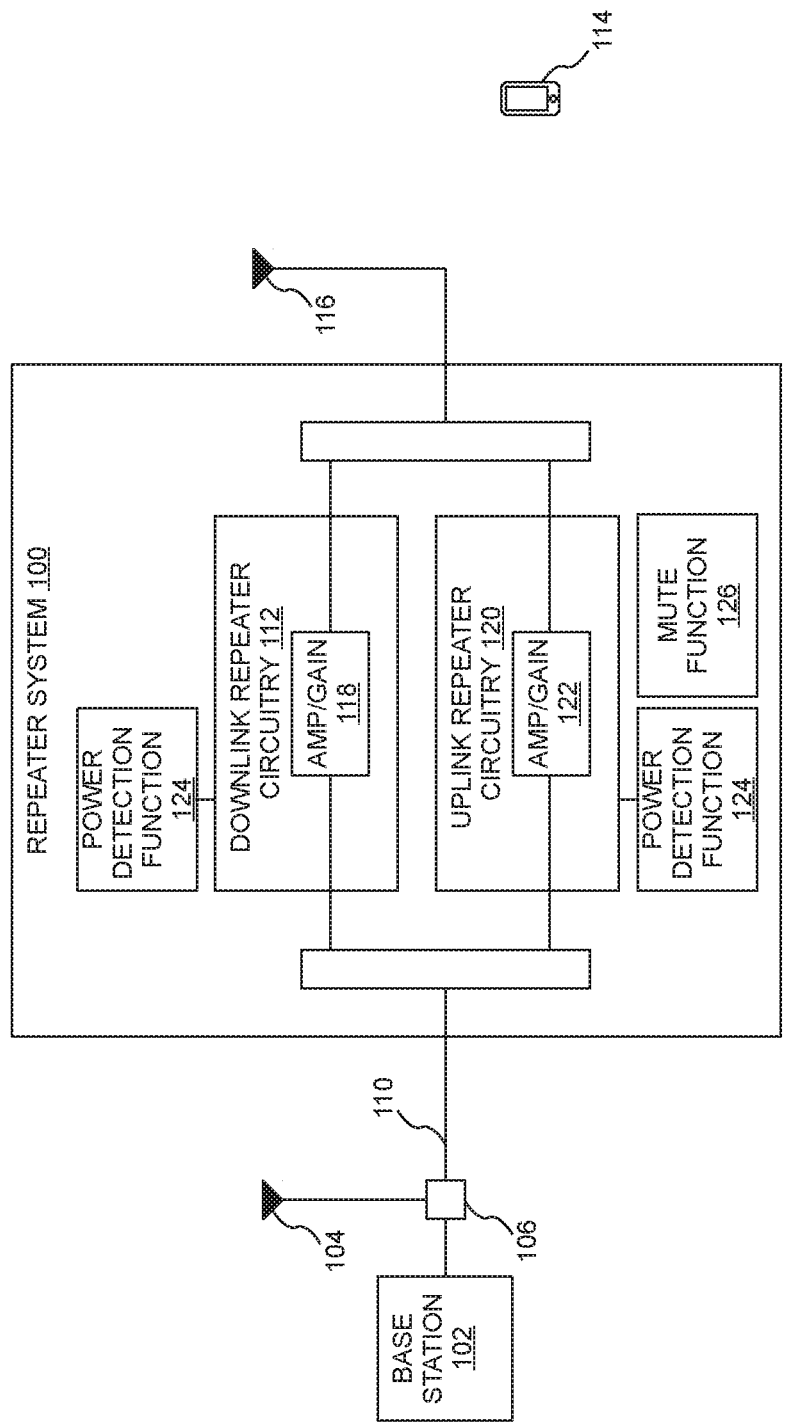
FIG. 1 is a block diagram illustrating one example embodiment of a repeater system in which the repeater mute feature described here can be implemented.

FIG. 1 is a block diagram illustrating one example embodiment of a repeater system 100 in which the repeater mute feature described here can be implemented.

The repeater system 100 is coupled to one or more base stations 102 and is configured to improve the wireless coverage provided by the base stations 102.

The capacity of each base station coupled to a repeater system can be dedicated to the repeater system or can be shared among the repeater systems and a base station antenna system that is co-located with the base station and/or one or more repeater systems.

In the exemplary embodiment shown in FIG. 1, the capacity of one or more base stations 102 is shared with the repeater system 100 and a base station antenna system 104 co-located with the base stations 102 by using RF splitters and combiners 106 and appropriate cables 110 to provide downlink and uplink RF signals to and from both the repeater system 100 and the co-located base station antenna system 104. Uplink RF signals from the co-located base station antenna system 104 and the repeater system 100 are combined by the RF combiner 106.

The base stations 102 can include one or more base stations that are used to provide commercial cellular wireless service and/or one or more base stations that are used to provide public and/or private safety wireless services (for example, wireless communications used by emergency services organizations (such as police, fire and emergency medical services) to prevent or respond to incidents that harm or endanger persons or property).

In general, the repeater system 100 comprises downlink repeater circuitry 112 that is configured to receive one or more downlink signals from one or more base stations 102. These signals are also referred to here as "base station downlink signals." Each base station downlink signal includes one or more radio frequency channels used for communicating in the downlink direction with user equipment (UE) 114 over the relevant wireless air interface. Typically, each base station downlink signal is received as an analog radio frequency signal, though in some embodiments one or more of the base station signals are received in a digital form (for example, in some repeater systems implemented as a digital DAS, one or more of the base station downlink signals are received in a digital baseband form complying with, for example, the Common Public Radio Interface ("CPR") protocol, Open Radio Equipment Interface ("ORP") protocol, the Open Base Station Standard Initiative ("OBSAI") protocol, or other protocol).

The downlink repeater circuitry 112 in the repeater system 100 is also configured to generate one or more downlink radio frequency signals that are radiated from one or more coverage antennas 116 associated with repeater system 100 for reception by user equipment 114. These downlink radio frequency signals are analog radio frequency signals and are also referred to here as "repeated downlink radio frequency signals." Each repeated downlink radio frequency signal includes one or more of the downlink radio frequency channels used for communicating with user equipment 114 over the wireless air interface. In this exemplary embodiment, the repeater system 100 is an active repeater system in which the downlink repeater circuitry 112 comprises one or more amplifiers (or other gain elements) 118 that are used to control and adjust the gain of the repeated downlink radio frequency signals radiated from the one or more coverage antennas 116.

Also, the repeater system 100 comprises uplink repeater circuitry 120 that is configured to receive one or more uplink radio frequency signals transmitted from the user equipment 114. These signals are analog radio frequency signals and are also referred to here as "UE uplink radio frequency signals." Each UE uplink radio frequency signal includes one or more radio frequency channels used for communicating in the uplink direction with user equipment 114 over the relevant wireless air interface.

The uplink repeater circuitry 120 in the repeater system 100 is also configured to generate one or more uplink radio frequency signals that are provided to the one or more base stations 102. These signals are also referred to here as "repeated uplink signals." Each repeated uplink signal includes one or more of the uplink radio frequency channels used for communicating with user equipment 114 over the wireless air interface. In this exemplary embodiment, the repeater system 100 is an active repeater system in which the uplink repeater circuitry 120 comprises one or more amplifiers (or other gain elements) 122 that are used to control and adjust the gain of the repeated uplink radio frequency signals provided to the one or more base stations 102.

Typically, each repeated uplink signal is provided to the one or more base stations 102 as an analog radio frequency signal, though in some embodiments one or more of the repeated uplink signals are provided to the one or more base stations 102 in a digital form (for example, in some repeater systems implemented as a digital DAS, one or more of the repeated uplink signals are provided to one or more base stations 102 in a digital baseband form complying with, for example, the CPRI protocol, ORI protocol, the OBSAI protocol, or other protocol).

The downlink repeater circuitry 112 and uplink repeater circuitry 120 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink repeater circuitry 112 and uplink repeater circuitry 120 may share common circuitry and/or components.

The repeater system 100 is configured to implement a power detection function 124 that detects and quantifies the power level of signals received at the repeater system 100 in either or both of the uplink or downlink. In one embodiment, the power detection function 124 can be implemented to separately detect and quantify the received power for the relevant downlink and uplink frequency bands for each base station 102 associated with the repeater system 100. The power detection function 124 can be implemented in other ways.

The repeater system 100 is also configured to implement a mute function 126. The mute function 126 is configured to transition the repeater circuitry 112 and/or 120 among at least a muted state and an unmuted state for the uplink and/or downlink frequency bands for each base station 102 associated with the repeater system 100.

While in the muted state, the relevant repeater circuitry 112 or 120 is configured to not output the repeated signals for the associated uplink and/or downlink frequency bands or alternatively to repeat the associated uplink and/or downlink frequency bands at a lower power level. While in the unmuted state, the relevant repeater circuitry 112 or 120 is configured to output the repeated signals for the associated uplink or downlink frequency bands at a normal power level.

For example, the repeater circuitry 112 and/or 120 can include one or more switches that can be switched so that, when the repeater circuitry 112 or 120 is placed in the muted state for a given base station 102, the repeater circuitry 112 or 120 does not output the relevant repeated signals and so that, when the repeater circuitry 112 or 120 is placed in the unmuted state for a given base station 102, the repeater circuitry 112 or 120 outputs the relevant repeated signal at normal power levels. In some examples, amplifiers (and other active elements in the repeater circuitry 112 or 120) used for outputting the repeated signals for a given base station 102 are powered down when the repeater circuitry 112 or 120 is placed in the muted state for that base station 102, in which case those powered-down amplifiers and other active elements would be powered-on when the repeater circuitry 112 or 120 is placed in the unmuted state for that base station 102.

The repeater circuitry 112 or 120 and the mute function 126 can be implemented in other ways. For example, instead of being configured to not output the repeated signals when in the muted state, the repeater circuitry 112 or 120 can be configured to output the repeated signals but at a reduced power level when in the muted state.

The mute function 126 is configured to transition the repeater circuitry 112 or 120 for a given base station 102 from the muted state to the unmuted state based on detecting changes in the received power level resulting from control transmissions for a wireless interface that are retransmittable.

The exemplary embodiment shown in FIG. 1 is described here in connection with an example where the mute function 126 is implemented for the uplink only. However, it is to be understood that the mute function 126 can be implemented for the downlink instead of, or in addition to, for the uplink. Also, in this example, the relevant control transmissions are made by a UE 114 while using the random access channel (RACH) procedure of the underlying air interface protocol to access the wireless network. However, it is to be understood that other control transmissions can be used.

In this example, the RACH procedures specify that, in the event that an initial RACH transmission is not successfully received by the relevant base station, the RACH transmission is retransmitted.

For example, the Long Term Evolution (LTE) standards (developed by the 3rd Generation Partnership Project (3GPP) standards organization) a RACH procedure is used by the UE 114 to access the wireless network. In the case of LTE, the access procedure is initiated by the UE 114 transmitting data on a Physical Random Access Channel (PRACH) defined by the LTE standards. The LTE standards specify that the initial PRACH transmit power is determined by the following equation:

$$P\_PRACH = \min\{P\_UE\_MAX, PREAMBLE\_RECEIVED\_TARGET\_POWER + PL\}$$

where:
"P_PRACH" is the initial PRACH transmit power for the UE 114;
"P_UE_MAX" is the maximum available transmit power of the UE 114;
"PREAMBLE_RECEIVED_TARGET_POWER" is the target receive power for the base station 102 (which is distributed by the base station 102 to the UE 114 on the downlink channel); and
"PL" is the path loss, which is calculated based on the downlink signal level received by the UE 114.

The above equation means that the initial PRACH transmit power of the UE 114 the lesser of the maximum available transmit power of the UE 114 and the sum of the target receive power for the base station 102 and the path loss.

The LTE standards also specify that, in the event that any PRACH transmission is not successful, the UE 114 retransmits the PRACH transmission with a specified increase in transmit power. Since the subframe duration in wireless standards like LTE is on the order of 1 millisecond (ms), and the RACH procedure is repeated if the initial RACH transmission is unsuccessful, the mute function 126 need not be configured to transition from the muted state to the unmuted state fast enough to enable the initial RACH transmission sent by the UE 114 to be successfully received by the relevant base station 102. Instead, the mute function 126 can be configured to transition from the muted state to the unmuted state fast enough to enable a subsequent RACH transmission sent by the UE 114 to be successfully received by the relevant base station 102. As a result, the power detection function 124 and mute function 126 can be implemented in a much simpler way than prior DSP-based techniques that provide fast response times. For example, the power detection function 124 and mute function 126 can be implemented using discrete analogue devices (like RMS power detectors, diodes, and operational amplifiers) and/or digital components (like analog-to-digital converters, micro controllers, or even digital signal processing units).

For example, such a simplified mute function 126 can be implemented using a first comparator that compares an output of the power detection function 124 with a first threshold power level, a second comparator that compares an output of the power detection function 124 with a second threshold power level, and micro-controller that receives the outputs of the first and second comparators, implements various timers, and transitions the uplink repeater circuitry 120 among the muted state and the unmuted state. However, this is one exemplary implementation and the mute function 126 can be implemented in other ways. For example, the mute function 126 can be implemented for the downlink repeater circuitry 112 or for both the downlink repeater circuitry 112 and the uplink repeater circuitry 120.

Figure 2:
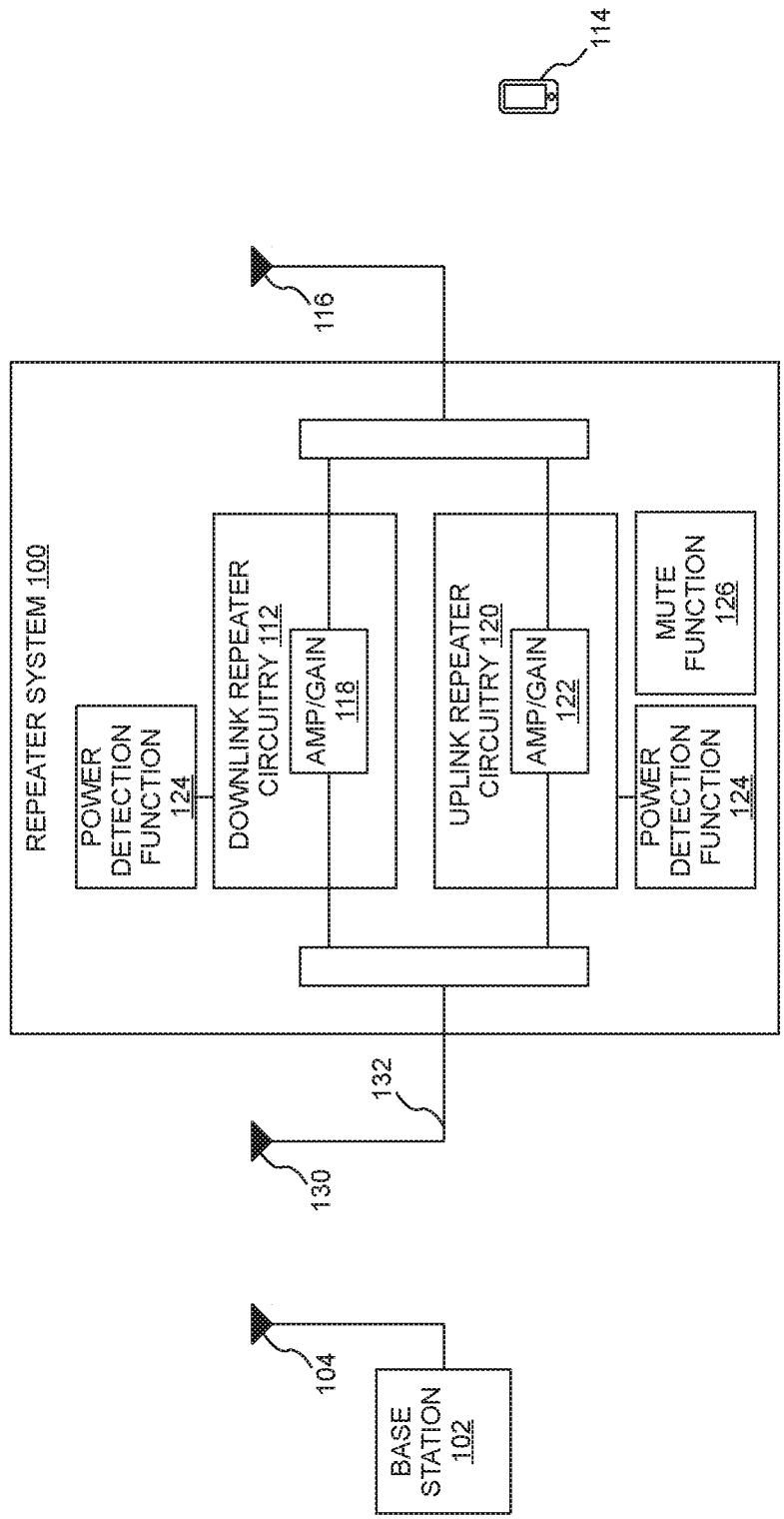
FIG. 2 is a block diagram illustrating another example embodiment of a repeater system in which the repeater mute feature described here can be implemented.

In the exemplary embodiment shown in FIG. 1, the capacity of one or more base stations 102 is shared with the repeater system 100 and the co-located base station antenna system 104 using RF splitters and combiners 106. It is to be understood, however, that the capacity of one or more of the base stations 102 can be shared with the repeater system 100 in other ways. For example, as shown in FIG. 2, the capacity of one or more of the base stations 102 can be shared with the repeater system 100 and the co-located base station antenna system 104 by using a donor antenna 130. In the exemplary embodiment shown in FIG. 2, downlink RF signals are radiated from the co-located base station antenna system 104 for reception by user equipment 114 and by the donor antenna 130 that is coupled to the repeater system 100 using appropriate cabling 132. The downlink RF signals received via the donor antenna 130 are then repeated by the repeater system 100. In the uplink direction, uplink RF signals repeated by the repeater system 100 are transmitted from the repeater system 100 and the donor antenna 130 for reception by the base stations 102 via the co-located base station antenna system 104. Uplink RF signals transmitted directly from UEs 114 combine with uplink RF signals transmitted by the repeater system 100 in the wireless RF channel such that the combined uplink RF signals are ultimately received by the base station 102 via the co-located base station antenna system 104.

The repeater system 100 can be stationary (that is, deployed at a fixed location) or mobile (for example, where the repeater system 100 is deployed on a moving vehicle such as a train, bus, or ship).

Figure 3:
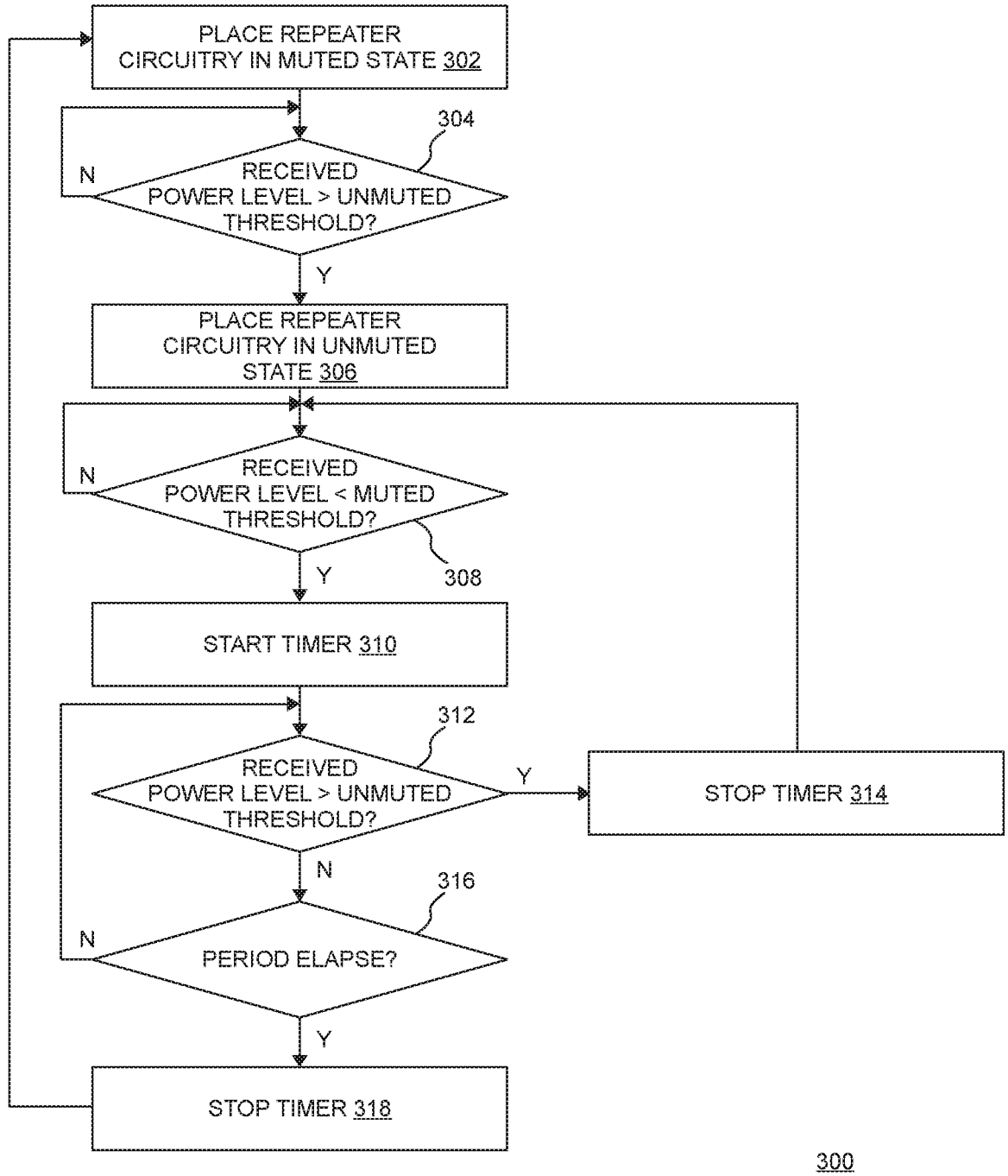
FIG. 3 is a flow diagram of one exemplary embodiment of a method of muting a repeater system.

FIG. 3 is a flow diagram of one exemplary embodiment of a method 300 of muting a repeater system. The embodiment of method 300 shown in FIG. 3 is described here as being implemented using the repeater system 100 of FIGS. 1 and 2 where the repeater system 100 is stationary, though it is to be understood that other embodiments can be implemented in other ways.

In such an embodiment where method 300 is implemented using the repeater systems 100 of FIGS. 1 and 2, at least some of the processing associated with method 300 is implemented by the mute function 126 and power detection function 124.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner).

The embodiment of method 300 shown in FIG. 3 is described here as being implemented for a particular signal path or channels in the uplink repeater circuitry 120 that is used to output the repeated uplink signals provided to a given base station 102. This base station 102 is also referred to here as the "associated base station 102." Also, the embodiment of method 300 shown in FIG. 3 is described here as being implemented to work with control transmissions that are made by a UE 114 while using the random access channel (RACH) procedure of the underlying air interface protocol to access the wireless network. In this example, the RACH procedures specify that, in the event that an initial RACH transmission is not successfully received by the relevant base station, the RACH transmission is retransmitted. However, it is to be understood that other embodiments can be implemented in other ways. For example, the mute function 126 can be implemented for the downlink instead of, or in addition to, for the uplink. Also, other control transmissions can be used.

Method 300 comprises placing the relevant repeater circuitry in the muted state for the associated base station 102 (block 302). In this example, the relevant repeater circuitry is the uplink repeater circuitry 120. While the relevant repeater circuitry 120 is in the muted state for the associated base station 102, the received power level is compared with a first threshold power level (block 304). The received power level is output by the power detection function 124. In this example, the received power level is detected for the relevant uplink frequency band associated with the selected base station 102.

Also, this first threshold power level is also referred to here as the "unmute threshold power level" or "unmute threshold." In one implementation, the unmute threshold can be determined experimentally during a factory or field calibration process. The unmute threshold can be determined in other ways. In this exemplary embodiment, the unmute threshold is configured to correspond to the minimum received power level that the repeater system 100 would measure when a UE 114 within the coverage area of the repeater system 100 is making an initial RACH transmission (though the unmute threshold can be configured to correspond to other levels).

If the received power level does not cross the unmute threshold, the uplink repeater circuitry 120 remains in the muted state for the associated base station 102. In this exemplary embodiment, the received power level crosses the unmute threshold when it becomes greater than the unmute threshold. Thus, in this exemplary embodiment, the received power level does not cross the unmute threshold while it does not become greater than the unmute threshold (for example, if there are no UEs 114 within the coverage area of the repeater system 100 accessing the wireless network). As noted above, when the uplink repeater circuitry 120 is in the muted state for the associated base station 102, the uplink repeater circuitry 120 does not output repeated uplink signals to the associated base station 102 (or output repeated uplink signals to the associated base station 102 at a reduced power level), thereby avoiding contributing noise to at the receiver of the associated base station 102 when there is no active UE 114 within the coverage area of the repeater system 100.

If the received power level crosses the unmute threshold (that is, becomes greater than the unmute threshold in this exemplary embodiment), the relevant repeater circuitry is placed in the unmuted state for the associated base station 102 (block 306). For example, in this exemplary embodiment, when a UE 114 within the coverage area of the repeater system 100 makes an initial RACH transmission in order to access the wireless network, the resulting received power level determined at the repeater system 100 will be greater than the unmute threshold, which causes the uplink repeater circuitry 120 to be placed in the unmuted state for the associated base station 102. As noted above, when the uplink repeater circuitry 120 is in the unmuted state for the associated base station 102, the uplink repeater circuitry 120 outputs repeated uplink signals to the associated base station 102 at the normal power level.

The uplink mute function 126 will not necessarily be able to change the state of the uplink repeater circuitry 120 to the unmuted state for the associated base station 102 fast enough to not lose the initial RACH transmission.

However, even though the initial RACH transmission will be lost, the UE 114 will retransmit the RACH transmission to access the wireless network at an increased power level. Because the uplink repeater circuity 120 will be in the unmuted state for the associated base station 102 and outputting repeated uplink signals to the associated base station 102 when the UE retransmits the RACH transmission, the base station 102 will be able to receive the retransmitted RACH transmission via the repeater system 100.

Moreover, even if the received power level of the initial RACH transmission is not greater than the unmute threshold, the power ramping functionality in the UE 114 will cause the RACH transmission to be retransmitted at progressively higher power levels, which ultimately should result in, at some point, the received power level of a retransmitted RACH transmission exceeding the unmute threshold, which causes the uplink repeater circuitry 120 to be placed in the unmuted state for the associated base station 102.

While the relevant repeater circuitry is in the unmuted state for the associated base station 102, the received power level for the associated base station 102 is compared with a second threshold power level (block 308). This second threshold power level is also referred to here as the "mute threshold power level" or "mute threshold."

In this exemplary embodiment, the mute threshold is configured to correspond to the maximum received power level that the repeater system 100 would measure after the UE 114 has completed making the initial RACH transmission while accounting for a certain amount of hysteresis. In one implementation, the mute threshold can be determined experimentally during a factory or field calibration process. The mute threshold can be determined in other ways. For example, the same value can be used for the mute threshold and the unmute threshold (that is, where the mute threshold is not configured to account for a certain amount of hysteresis).

If the received power level crosses the mute threshold, a timer is started for the given base station 102 (block 310). The timer is configured to determine when a predetermined period has elapsed.

In this exemplary embodiment, the received power level crosses the mute threshold when the received power level becomes less than the mute threshold. After the UE 114 finishes making the initial RACH transmission, the received power level will drop (with a certain amount of hysteresis). The comparison of the received power level with the mute threshold will detect this event, which corresponds to the received power level being less than the mute threshold.

The predetermined period for the timer is an adjustable value. With spread spectrum signals, the received power level can be close to the noise level and thus may fall below the mute threshold. To avoid unwanted muting of the uplink repeater circuitry 120, the predetermined period for the timer is configured to keep the uplink repeater circuitry 120 long enough for the UE 114 to retransmit the RACH transmission and access the wireless network.

After finishing a data connection, a follow-up connection can happen within a short period of time (especially, in public safety applications). Therefore, the predetermined period for the timer can be configured to be long enough to keep the uplink repeater circuit 120 in the unmuted state for an additional amount of time in order to avoid losing the initial RACH transmission of any follow-up connection (compared to the case when being in the muted state). In some applications, a predetermined period on the order of about 30 minutes can be used.

While the timer is running and the predetermined period has not elapsed, the received power level for the associated base station 102 is compared with the unmute threshold (block 312). If the received power level crosses the unmute threshold, the timer is reset (stopped) (block 314), the relevant repeater circuitry remains in the unmuted state for the base station 102 (returning to block 306), and the processing of method 300 starting with block 308 is repeated. This situation will occur while the relevant control transmission is retransmitted. As noted above, in this exemplary embodiment, the received power level crosses the unmute threshold when the received power level becomes greater than the unmute threshold. In this example, this situation will occur while the UE 114 retransmits the RACH transmission and during the period that the UE 114 accesses the wireless network. This causes the uplink repeater circuitry 120 to remain in the unmuted state while this is occurring.

If the predetermined period elapses without the received power level ever crossing the unmute threshold (checked in block 316), the timer is reset (stopped) (block 318) and the relevant repeater circuitry is placed in the muted state for the base station 102 (returning to block 302) and the processing of method 300 starting with block 302 is repeated. This will occur after the control transmissions and any subsequent related control and user-data transmissions are finished. In this example, this will occur after the UE 114 has completed its access to the wireless network (assuming there is no other active UE 114 accessing the wireless network).

As a result of the processing of method 300, the mute function 126 can be configured to transition the relevant uplink repeater circuitry 120 from the muted state to the unmuted state fast enough to enable a subsequent RACH transmission sent by the UE 114 (or other control transmission) to be successfully repeated (and, in this example, successfully received by the relevant base station 102). Consequently, the power detection function 124 and mute function 126 can be implemented in a much simpler way than prior DSP-based techniques that are used to provide fast response times.

Also, in cases where there is no user equipment 114 is using the repeater system 100, the uplink repeater circuitry 120 can be turned off. Doing this reduces the power consumption of the repeater system 100 and saves energy and the associated cost. Depending on the power class of the repeater system 100, the savings can be considerable. Lower power consumption also results higher efficiency.

The muting functionality described here is especially well suited for use in public safety applications where the capacity of a public safety base station is shared by a large number of repeater systems at a variety of sites where the public safety wireless network is rarely used. In these applications, combining uplink signals from the many repeater systems can result in a large noise contribution at the receiver of the base station from the many repeater systems that are not being used. The muting functionality described here can be used to place the uplink repeater circuitry of unused repeater systems in a muted state, which can eliminate the noise contribution from those unused repeater systems at the receiver of the base station. The muting functionality can also be used with other types of base stations (such as commercial base stations).

Method 300 can be implemented in other ways. For example, after reception of the initial RACH transmission is detected (by detecting the received power level being greater than the unmute threshold), the uplink repeater circuitry 120 is not placed in the unmuted state until after reception of a retransmitted RACH transmission at an increased power level is detected (by detecting the received power level being greater than an increased unmute threshold, where the threshold is increased by an amount that corresponds to the increased power level of the retransmitted RACH transmission). This provides an additional degree of verification before switching the uplink repeater circuitry into the unmuted state, which should help avoid switching the uplink repeater circuitry into the unmuted state in response to a spike in the received power level due to noise or a source of interference.

Moreover, as noted above, method 300 and the mute function 126 can be implemented in other ways. For example, method 300 and the mute function 126 can be implemented for the downlink instead of, or in addition to, for the uplink.

Figure 4:
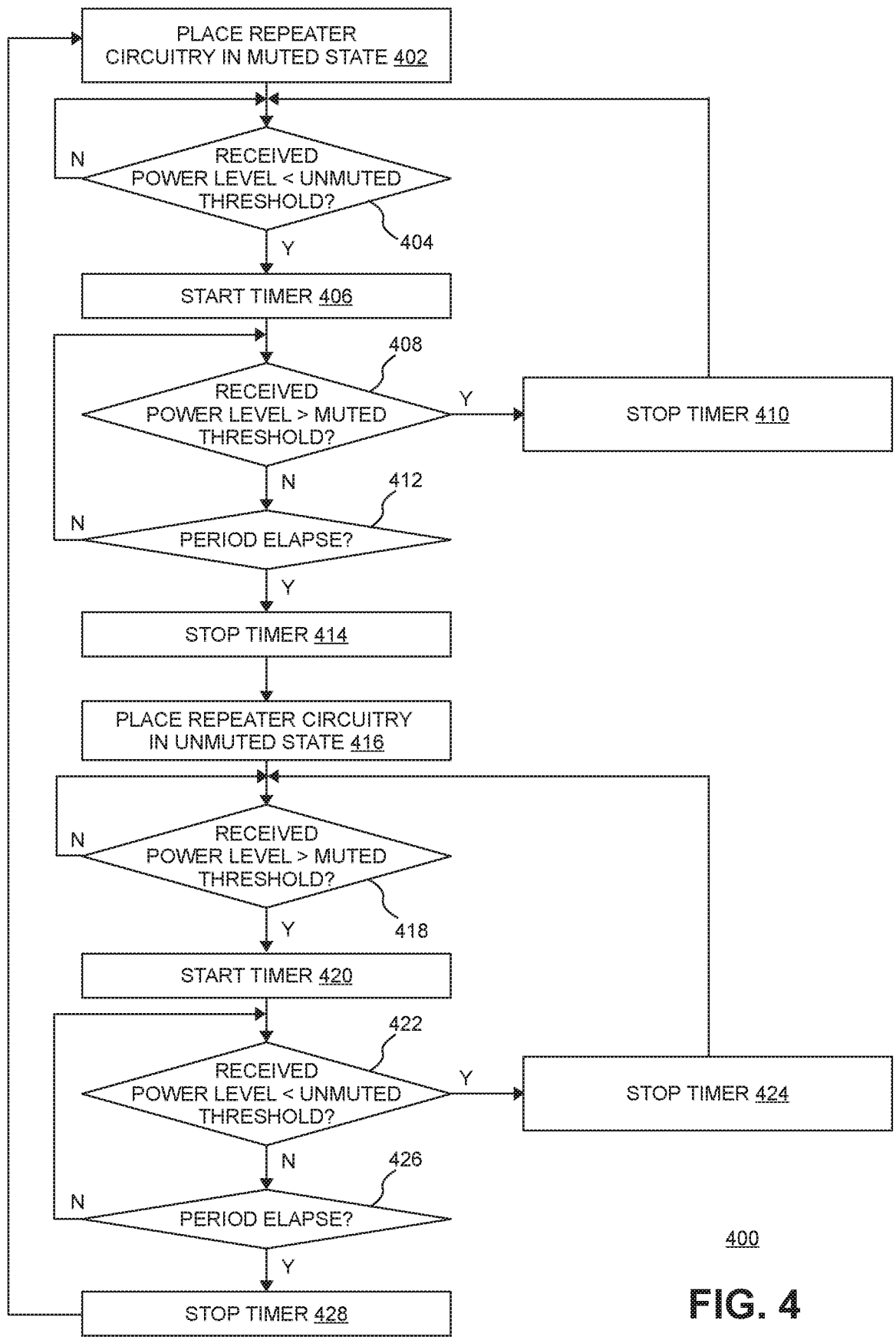
FIG. 4 is a flow diagram of another exemplary embodiment of a method of muting a repeater system.

Also, other control transmissions can be used. One such example is shown in FIG. 4. Moreover, a timer (or other confirmation mechanism) can be used with the transition from the muted state to the unmuted state in addition to or instead of the transition from the unmuted state to the muted state. One such example is shown in FIG. 4. In other embodiments, a timer (or other confirmation mechanism) is not used for either transition.

FIG. 4 is a flow diagram of one exemplary embodiment of a method 400 of muting a repeater system. The embodiment of method 400 shown in FIG. 4 is described here as being implemented using the repeater system 100 of FIG. 2 where the repeater system 100 is mobile, though it is to be understood that other embodiments can be implemented in other ways.

In such an embodiment where method 400 is implemented using the repeater system 100 of FIG. 2, at least some of the processing associated with method 300 is implemented by the mute function 126 and power detection function 124.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner).

The embodiment of method 400 shown in FIG. 4 is described here as being implemented for a particular signal path or channels in the uplink repeater circuitry 120 that is used to output the repeated uplink signals provided to a given base station 102. This base station 102 is also referred to here as the "associated base station 102." Also, the embodiment of method 400 shown in FIG. 4 is described here as being implemented by measuring the received power level of downlink transmissions received from the associated base station 102 and using this received power level to determine whether or not to mute the uplink. However, it is to be understood that other embodiments can be implemented in other ways. For example, the mute function 126 can be implemented for the downlink instead of, or in addition to, for the uplink.

Method 400 comprises placing the relevant repeater circuitry in the muted state for the associated base station 102 (block 402). In this example, the relevant repeater circuitry is the uplink repeater circuitry 120. While the relevant repeater circuitry 120 is in the muted state for the associated base station 102, the received power level is compared with a first threshold power level (block 404). The received power level is output by the power detection function 124. In this example, the received power level is detected for the relevant downlink frequency band associated with the selected base station 102.

Also, this first threshold power level is also referred to here as the "unmute threshold power level" or "unmute threshold." In one implementation, the unmute threshold can be determined experimentally during a factory or field calibration process. The unmute threshold can be determined in other ways. In this exemplary embodiment where the repeater system 100 is mobile, the unmute threshold is configured to correspond to a received power level that the repeater system 100 would measure when the mobile repeater system 100 has moved far enough away from the associated base station 102 so that the path loss (attenuation) between the repeater system 100 and the associated base station 102 is sufficient to avoid contributing noise at the receiver of the associated base station 102 if the repeater system 100 were unmuted (though the unmute threshold can be configured to corresponding to other levels).

If the received power level does not cross the unmute threshold, the uplink repeater circuitry 120 remains in the muted state for the associated base station 102. In this exemplary embodiment, the received power level crosses the unmute threshold when it becomes less than the unmute threshold. Thus, in this exemplary embodiment, the received power level does not cross the unmute threshold while the received power level does not become less than the unmute threshold (for example, if the repeater system 100 has not moved far enough away from the associated base station 102 so that the path loss between the repeater system 100 and the associated base station 102 is sufficient to avoid contributing noise at the receiver of the associated base station 102 if the repeater system 100 were unmuted). As noted above, when the uplink repeater circuitry 120 is in the muted state for the associated base station 102, the uplink repeater circuitry 120 does not output repeated uplink signals to the associated base station 102 (or output repeated uplink signals to the associated base station 102 at a reduced power level), thereby avoiding contributing noise at the receiver of the associated base station 102 when there is not sufficient path loss between the repeater system 100 and the associated base station 102.

If the received power level crosses the unmute threshold (that is, becomes less than the unmute threshold in this exemplary embodiment), a transition process for operating the relevant repeater circuitry in the unmuted state for the associated base station 102 is performed. For example, in this exemplary embodiment, when the repeater system 100 has moved far enough away from the associated base station 102 so that the path loss between the repeater system 100 and the associated base station 102 is sufficient to avoid contributing noise at the receiver of the associated base station 102 if the repeater system 100 were unmuted, the resulting received power level determined at the repeater system 100 will be less than the unmute threshold.

In this example, the transition process for operating the relevant repeater circuitry in the unmuted state for the associated base station 102 involves the use of a confirmation mechanism to confirm that the relevant repeater circuitry should be operated in the unmuted state (though in other embodiments, the relevant repeater circuitry can be transitioned to the unmuted state for the associated base station 102 without the use of a confirmation mechanism or with the use of a different or additional confirmation mechanism). In this example, the relevant repeater circuitry is transitioned to operating in the unmuted state for the associated base station 102 after a predetermined period elapses without the received power level ever crossing a second threshold power level. This second threshold power level is also referred to here as the "mute threshold power level" or "mute threshold."

In this exemplary embodiment where the repeater system 100 is mobile, the mute threshold is configured to correspond to a received power level that the repeater system 100 would measure when the mobile repeater system 100 has moved so close to the associated base station 102 that the path loss (attenuation) between the repeater system 100 and the associated base station 102 is not sufficient to avoid contributing noise at the receiver of the associated base station 102 if the repeater system 100 were not muted (though the mute threshold can be configured to corresponding to other levels). In one implementation, the mute threshold can be determined experimentally during a factory or field calibration process. The mute threshold can be determined in other ways. For example, the same value can be used for the mute threshold and the unmute threshold (that is, where the mute threshold is not configured to account for a certain amount of hysteresis).

In this embodiment, if the received power level crosses the unmute threshold, a timer is started for the associated base station 102 (block 406). The timer is configured to determine when a first predetermined period has elapsed. The first predetermined period for the timer can be an adjustable value.

While the timer is running and the first predetermined period has not elapsed, the received power level for the associated base station 102 is compared with the mute threshold (block 408). If the received power level crosses the mute threshold, the timer is reset (stopped) (block 410), the relevant repeater circuitry remains in the muted state for the base station 102 (returning to block 402), and the processing of method 400 starting with block 402 is repeated. That is, in this case, the confirmation mechanism did not confirm that the relevant repeater circuitry should be placed in the unmuted state.

In this exemplary embodiment, the received power level crosses the mute threshold when the received power level exceeds the mute threshold.

If the first predetermined period elapses without the received power level ever crossing the mute threshold (checked in block 412), the timer is reset (stopped) (block 414) and the relevant repeater circuitry is placed in the unmuted state for the base station 102 (block 416). That is, in this case, the confirmation mechanism confirmed that the relevant repeater circuitry should be placed in the unmuted state. This will occur when the mobile repeater system 100 has moved far enough away from the associated base station 102 that the path loss (attenuation) between the repeater system 100 and the associated base station 102 is sufficient to avoid contributing noise at the receiver of the associated base station 102 if the repeater system 100 were not muted.

As noted above, when the uplink repeater circuitry 120 is in the unmuted state for the associated base station 102, the uplink repeater circuitry 120 outputs repeated uplink signals to the associated base station 102 at the normal power level.

While the relevant repeater circuitry is in the unmuted state for the associated base station 102, the received power level for the associated base station 102 is compared with the mute threshold (block 418).

If the received power level does not cross the mute threshold, the uplink repeater circuitry 120 remains in the unmuted state for the associated base station 102. In this exemplary embodiment, the received power level crosses the mute threshold when the received power level becomes greater than the mute threshold. The comparison of the received power level with the mute threshold will detect this event, which corresponds to the received power level being greater than the mute threshold.

If the received power level crosses the mute threshold (that is, exceeds the mute threshold in this exemplary embodiment), a transition process for operating the relevant repeater circuitry in the muted state for the associated base station 102 is performed.

In this example, the transition process for operating the relevant repeater circuitry in the muted state for the associated base station 102 involves the use of a confirmation mechanism to confirm that the relevant repeater circuitry should be operated in the muted state (though in other embodiments, the relevant repeater circuitry can be transitioned to the muted state for the associated base station 102 without the use of a confirmation mechanism or with the use of a different or additional confirmation mechanism). In this example, the relevant repeater circuitry is transitioned to operating in the muted state for the associated base station 102 after a predetermined period elapses without the received power level ever crossing the unmute threshold.

In this embodiment, if the received power level crosses the mute threshold, a timer is started for the given base station 102 (block 420). The timer is configured to determine when a second predetermined period has elapsed. The second predetermined period for the timer can be an adjustable value. The first predetermined period can be the same as the second predetermined period or the first and second predetermined periods can differ from one another.

While the timer is running and the second predetermined period has not elapsed, the received power level for the associated base station 102 is compared with the unmute threshold (block 422). If the received power level crosses the unmute threshold, the timer is reset (stopped) (block 424), the relevant repeater circuitry remains in the unmuted state for the base station 102 (returning to block 416), and the processing of method 400 starting with block 418 is repeated. That is, in this case, the confirmation mechanism did not confirm that the relevant repeater circuitry should be placed in the muted state.

As noted above, in this exemplary embodiment, the received power level crosses the unmute threshold when the received power level becomes less than the unmute threshold.

If the second predetermined period elapses without the received power level ever crossing the unmute threshold (checked in block 426), the timer is reset (stopped) (block 428) and the relevant repeater circuitry is placed in the muted state for the base station 102 (returning to block 402) and the processing of method 400 starting with block 402 is repeated. That is, in this case, the confirmation mechanism confirmed that the relevant repeater circuitry should be placed in the muted state. This will occur when the mobile repeater system 100 has moved so close to the associated base station 102 that the path loss (attenuation) between the repeater system 100 and the associated base station 102 is not sufficient to avoid contributing noise at the receiver of the associated base station 102 if the repeater system 100 were not muted.

Moreover, the repeater system muting techniques described here can be used for other reasons. For example, the repeater system 100 can be muted in order to enable a UE to communicate with the base station 102 using a Multiple Input Multiple Output (MIMO) transmission mode that is not supported by the repeater system 100. In one such example, when operating an active mobile Single Input Single Output (SISO) repeater system 100 in a train (or other vehicle) where the base station 102 is otherwise configured to provide MIMO coverage outside the train, the UEs inside the train will typically operate in SISO mode (due to the large power imbalance between the stream amplified by the repeater system 100 and the stream that is not amplified by the repeater system 100, which will be attenuated by the carriage of the train). Having the UEs inside the train use a SISO mode is desirable where the coverage conditions are such that the high signal-to-noise (SNR) SISO signals provided via the repeater system 100 outperform (from a throughput point of view) the low SNR MIMO signals communicated directly with the base station 102 through the carriage of the train.

However, at a certain point it may be desirable to mute the repeater system 100 in order to favor the MIMO coverage provided directly with the base station 102. This may occur when the coverage conditions are such that the MIMO signals communicated directly with the base station 102 through the carriage of the train will have sufficient SNR to outperform (from a throughput point of view) the SISO signals communicated via the repeater system 100. When this is the case, the repeater system 100 can be muted. This can be done by setting the mute and unmute thresholds appropriately.

This approach can also be used in situations where the repeater system 100 is configured to support a lower-order MIMO mode (for example, a 2×2 MIMO mode) and where the base station 102 is otherwise configured to use a higher-order MIMO mode (for example, a 4×4 MIMO mode).

Figure 5:
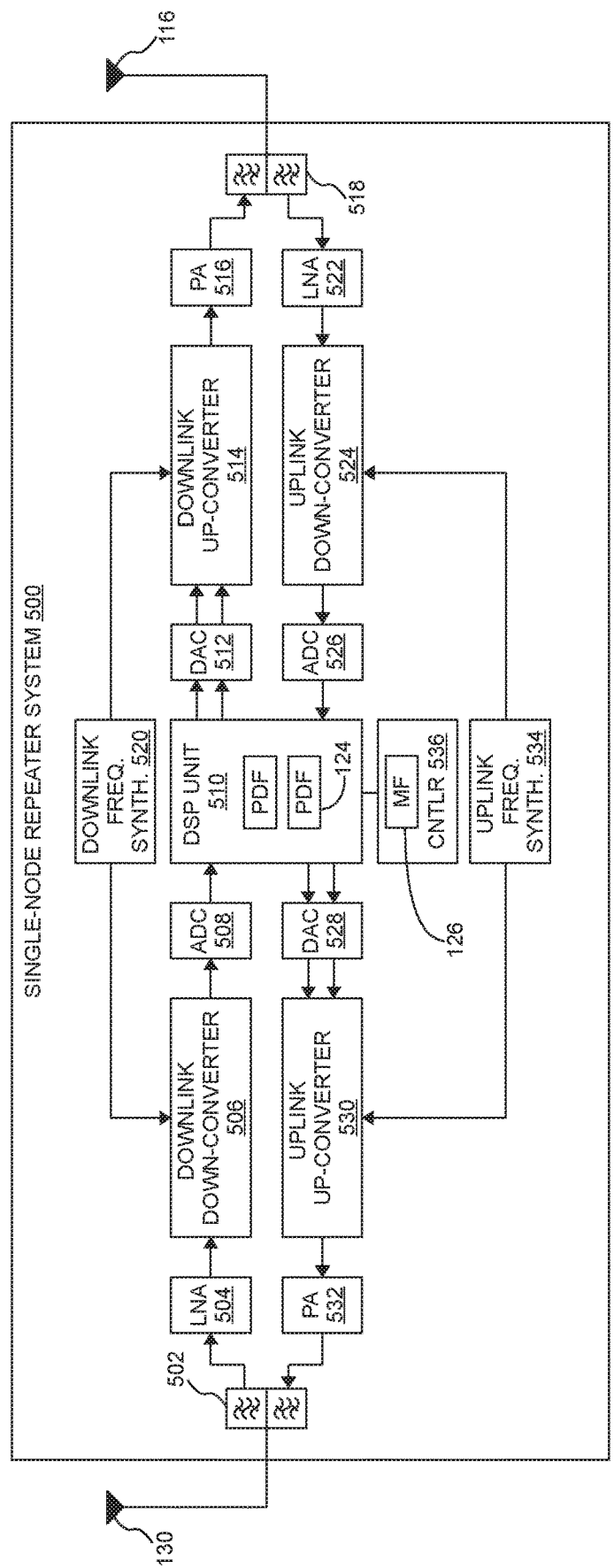
FIG. 5 illustrates one exemplary embodiment of a single-node repeater in which the uplink mute feature described here can be implemented.

As noted above, the repeater system 100 can be implemented in many ways. For example, the repeater system 100 can be implemented as a single-node repeater. FIG. 5 illustrates one exemplary embodiment of a single-node repeater 500 in which the uplink mute feature described here can be implemented.

In the exemplary embodiment shown in FIG. 5, the single-node repeater 500 is coupled to a base station 102 using a donor antenna 130 as shown in FIG. 2.

The single-node repeater 500 comprises a first duplexer 502 having a common port that is coupled to the donor antenna 130 via cable 132.

The single-node repeater 500 further comprises a low noise amplifier (LNA) 504 that is coupled to a downlink port of the first duplexer 502. The first duplexer 502 receives downlink signals from the base station 102 (not shown in FIG. 5) via the donor antenna 130 and outputs the received downlink signals to the LNA 504 via its downlink port. The LNA 504 amplifies the base station downlink signals.

The single-node repeater 500 further comprises a downlink down-converter 506 that is coupled to the output of the LNA 504. The downlink down-converter 506 filters and down-converts the amplified downlink signals and outputs a down-converted downlink signal.

The single-node repeater 500 further comprises a downlink analog-to-digital converter (ADC) 508 that is configured to digitize the down-converted downlink signal to produce real downlink digital samples indicative of the down-converted downlink signal (and the corresponding originally received downlink signal).

The single-node repeater 500 further comprises a digital signal processor (DSP) unit or circuit 510. The DSP unit 510 is configured to digitally down-convert the real downlink digital samples to produce baseband digital in-phase and quadrature samples. These downlink digital IQ samples can also be filtered, amplified, attenuated, and/or re-sampled or decimated to a lower sample rate.

In the exemplary embodiment shown in FIG. 5, the downlink down-converter 506 and downlink ADC 508 are configured to produce real digital samples for a relatively wide frequency band. In this embodiment, the DSP unit 510 is configured to digitally filter the real digital samples in order to produce downlink digital IQ samples for a relatively narrow frequency band, where the resulting downlink digital IQ samples are then digitally amplified. In this way, the particular narrow frequency band that the single-node repeater 500 repeats, as well as the applied gain, can be configured via software.

The amplified downlink digital IQ samples are output by the DSP unit 510 to a downlink digital-to-analog converter (DAC) 512 that is included in the single-node repeater 500. The downlink DAC 512 produces analog in-phase and quadrature signals that are output to a downlink up-converter 514 that is included in the single-node repeater 500. The downlink up-converter 514 quadrature modulates the analog in-phase and quadrature signals to produce a real analog signal, which it up-converts to the desired RF frequency. The downlink up-converter 514 also filters the downlink analog radio frequency signal.

The single-node repeater 500 further comprises a downlink power amplifier (PA) 516, which power amplifies the downlink analog radio frequency signal. The amplified downlink analog radio frequency signal is provided to a coverage antenna 116 associated with the single-node repeater 500 via a second duplexer 518, from which the amplified analog radio frequency signal is radiated to any user equipment 114 (not shown in FIG. 5) that is in the coverage area of the single-node repeater 500.

The single-node repeater 500 further comprises a downlink frequency synthesizer 520 that is configured to generate a local oscillator signal used by the downlink down-converter 506 and the downlink up-converter 514.

The single-node repeater 500 further comprises an uplink low noise amplifier (LNA) 522 that is coupled to an uplink port of the second duplexer 518. The second duplexer 518 receives any UE uplink radio frequency signals from any active user equipment 114 via the associated coverage antenna 116 and outputs the received uplink signal to the LNA 522 via its uplink port. The LNA 522 amplifies the received uplink signals.

The single-node repeater 500 further comprises an uplink down-converter 524 that is coupled to the output of the LNA 522. The uplink down-converter 524 filters and down-converts the amplified uplink signals and outputs a down-converted uplink signal.

The single-node repeater 500 further comprises an uplink analog-to-digital converter (ADC) 526 that is configured to digitize the down-converted uplink signal to produce real downlink digital samples indicative of the down-converted uplink signal (and the corresponding originally received uplink signal).

In the exemplary embodiment shown in FIG. 5, the same DSP unit 510 is used for both downlink and uplink digital processing (though it is to be understood that separate DSP units could be used). The DSP unit 510 is configured to digitally down-convert the real uplink digital samples to produce baseband digital in-phase and quadrature samples. These uplink digital IQ samples can also be filtered, amplified, attenuated, and/or re-sampled or decimated to a lower sample rate.

In the exemplary embodiment shown in FIG. 5, the uplink down-converter 524 and uplink ADC 526 are configured to produce real digital samples for a relatively wide frequency band. In this embodiment, the DSP unit 510 is configured to digitally filter the real digital samples in order to produce uplink digital IQ samples for a relatively narrow frequency band, where the resulting uplink digital IQ samples are then digitally amplified. In this way, the particular narrow frequency band that the single-node repeater 500 repeats, as well as the applied gain, can be configured via software.

The amplified uplink digital IQ samples are output by the DSP unit 510 to an uplink digital-to-analog (DAC) converter 528 that is included in the single-node repeater 500. The uplink DAC 528 produces analog in-phase and quadrature signals that are output to an uplink up-converter 530 that is included in the single-node repeater 500. The uplink up-converter 530 quadrature modulates the analog in-phase and quadrature signals to produce a real analog signal, which it up-converts to the desired RF frequency. The uplink up-converter 530 also filters the uplink analog radio frequency signal.

The single-node repeater 500 further comprises an uplink power amplifier (PA) 532, which power amplifies the uplink analog radio frequency signal. The amplified uplink analog radio frequency signal is provided to the donor antenna 130 via the second duplexer 502.

The single-node repeater 500 further comprises an uplink frequency synthesizer 534 that is configured to generate a local oscillator signal that is used by the uplink down-converter 524 and the uplink up-converter 530.

The single-node repeater 500 further comprises a controller 536. The controller 536 is implemented using one or more programmable processors that execute software that is configured to implement various features described here as being implemented by the controller 536 (or the single-node repeater 500 more generally). The controller 536 (more specifically, the various features described here as being implemented by the controller 536 or the single-node repeater 500) (or portions thereof) can be implemented in other ways (for example, in a field programmable gate array (FPGA), application specific integrated circuit (ASIC), etc.).

In the exemplary shown in FIG. 5, the power detection function 124 can be implemented in the DSP unit 510 to determine a received power level for the original uplink radio frequency signal received by the single-node repeater 500. The DSP unit 510 can determine the received power level based on the digital samples generated from the original uplink radio frequency signal received by the single-node repeater 500. The mute function 126 can be implemented in the controller 536 to have the controller 536 implement the mute feature described above in connection with FIGS. 1-4. Also, the mute function 126 can be implemented for the downlink instead of, or in addition to, for the uplink.

The single-node repeater can be implemented in other ways (for example, where no digital signal processing is performed in the downlink and uplink repeater circuitry and instead only analog filtering and amplification is used).

The repeater system 100 can be implemented in other ways.

Figure 6:
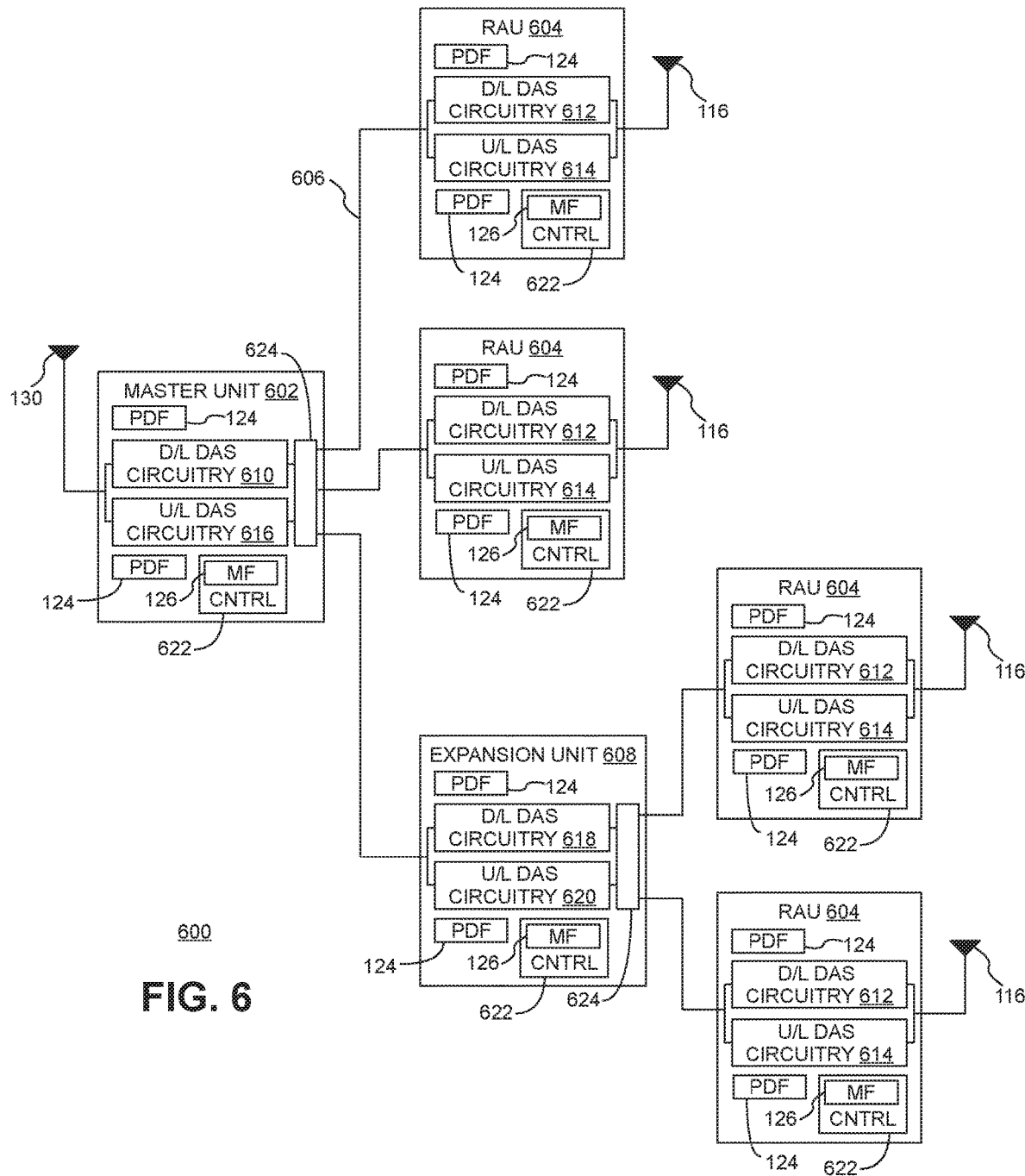
FIG. 6 illustrates one exemplary embodiment of a distributed antenna system in which the uplink mute feature described here can be implemented.

For example, the repeater system 100 can be implemented as a distributed antenna system (DAS). FIG. 6 illustrates one exemplary embodiment of a distributed antenna system 600 in which the uplink mute feature described here can be implemented.

The DAS 600 comprises one or more master units 602 that are communicatively coupled to one or more remote antenna units 604 via one or more cables 606. Each remote antenna unit 604 can be communicatively coupled directly to one or more of the master units 602 or indirectly via one or more other remote antenna units 604 and/or via one or more expansion (or other intermediary) unit 608.

Each master unit 604 is communicatively coupled to one or more base stations 102 (not shown in FIG. 6). In the exemplary embodiment shown in FIG. 6, each master unit 602 is coupled to a base station 102 using a donor antenna 130 as shown in FIG. 2.

The base stations 102 can also be coupled to the master units 602 using a network of attenuators, combiners, splitters, amplifiers, filters, cross-connects, etc., (sometimes referred to collectively as a "point-of-interface" or "POI"). This network can be included in the master units 602 and/or can be separate from the master units 602. This is done so that, in the downlink, the desired set of RF channels output by the base stations 102 can be extracted, combined, and routed to the appropriate master units 602, and so that, in the upstream, the desired set of carriers output by the master units 602 can be extracted, combined, and routed to the appropriate interface of each base station 102. It is to be understood, however, that this is one example and that other embodiments can be implemented in other ways.

In general, each master unit 602 comprises downlink DAS circuitry 610 that is configured to receive one or more downlink signals from one or more base stations 102. Each base station downlink signal includes one or more radio frequency channels used for communicating in the downlink direction with user equipment 114 (not shown in FIG. 6) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORP") protocol, the Open Base Station Standard Initiative ("OBSAI") protocol, or other protocol).

The downlink DAS circuitry 610 in each master unit 602 is also configured to generate one or more downlink transport signals derived from one or more base station downlink signals and to transmit one or more downlink transport signals to one or more of the remote antenna units 604.

Each remote antenna unit 604 comprises downlink DAS circuitry 612 that is configured to receive the downlink transport signals transmitted to it from one or more master units 602 and to use the received downlink transport signals to generate one or more downlink radio frequency signals that are radiated from one or more coverage antennas 116 associated with that remote antenna unit 604 for reception by user equipment 114. In this way, the DAS 600 increases the coverage area for the downlink capacity provided by the base stations 102.

Also, each remote antenna unit 604 comprises uplink DAS circuitry 614 that is configured to receive one or more uplink radio frequency signals transmitted from the user equipment 114. These signals are analog radio frequency signals.

The uplink DAS circuitry 614 in each remote antenna unit 604 is also configured to generate one or more uplink transport signals derived from the one or more remote uplink radio frequency signals and to transmit one or more uplink transport signals to one or more of the master units 602.

Each master unit 602 comprises uplink DAS circuitry 616 that is configured to receive the respective uplink transport signals transmitted to it from one or more remote antenna units 604 and to use the received uplink transport signals to generate one or more base station uplink radio frequency signals that are provided to the one or more base stations 102 associated with that master unit 602. Typically, this involves, among other things, combining or summing uplink signals received from multiple remote antenna units 604 in order to produce the base station signal provided to each base station 102. In this way, the DAS 600 increases the coverage area for the uplink capacity provided by the base stations 102.

Each expansion unit 608 comprises downlink DAS circuitry 618 that is configured to receive the downlink transport signals transmitted to it from the master unit 602 (or other expansion unit 608) and transmits the downlink transport signals to one or more remote antenna units 604 or other downstream expansion units 608. Each expansion unit 608 also comprises uplink DAS circuitry 620 that is configured to receive the respective uplink transport signals transmitted to it from one or more remote antenna units 604 or other downstream expansion units 608, combine or sum the received uplink transport signals, and transmit the combined uplink transport signals upstream to the master unit 602 or other expansion unit 608.

In other embodiments, one or more remote antenna units 604 are coupled to one or more master units 602 via one or more other remote antenna units 604 (for examples, where the remote antenna units 604 are coupled together in a daisy chain or ring topology).

The downlink DAS circuitry 610, 612, and 618 and uplink DAS circuitry 614, 616, and 620 in each master unit 602, remote antenna unit 604, and expansion unit 608, respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry 610, 612, and 618 and uplink DAS circuitry 614, 616, and 620 may share common circuitry and/or components.

The DAS 600 can use either digital transport, analog transport, or combinations of digital and analog transport for generating and communicating the transport signals between the master units 602, the remote antenna units 604, and any expansion units 608.

Each unit 602, 604, and 608 in the DAS 600 also comprises a respective controller 622. The controller 622 is implemented using one or more programmable processors that execute software that is configured to implement the various features described here as being implemented by the controller 622. The controller 622 (more specifically, the various features described here as being implemented by the controller 622) (or portions thereof) can be implemented in other ways (for example, in a field programmable gate array (FPGA), application specific integrated circuit (ASIC), etc.).

In the exemplary shown in FIG. 6, the power detection function 124 can be implemented in the master unit 602 to determine a received power level for combined uplink signal that results from combining the uplink signals from all of the remote antenna units 604. In such an example, the mute function 126 can be implemented in the controller 622 of the master unit 604 to have the controller 622 implement the mute feature described above in connection with FIGS. 1-4.

Noise contribution can also result from the combining or summing that occurs in the uplink signal path of the DAS 600. In the example shown in FIG. 6, each master unit 602 and expansion unit 608 includes a simulcast/combining function 624 that simulcasts (that is, splits or makes copies of) the downlink signals to multiple remote antenna units 604 and combines or sums uplink signals received from multiple remote antenna units 604.

However, the combining or summing that occurs within the uplink signal path of the DAS 600 also combines or sums the noise added by the active elements of the uplink signal path. To address this, the mute functionality described above in connection with FIGS. 1-3 can also be implemented locally within each remote antenna unit 604 and each expansion unit 608. That is, in such embodiments, the relevant repeater circuitry discussed above in connection with FIGS. 1-3 comprises the uplink DAS circuitry 614 and 620 in each remote antenna unit 604 and each intermediary unit 608, where the uplink DAS circuitry 614 and 620, while operated in the muted state, either does not output the uplink transport signal to the upstream unit (for example, a master unit 602, an upstream expansion unit 608, or an upstream remote unit 604) or outputs the uplink transport signal with an associated power or gain level that is less than the "normal" power or gain level that is used while the uplink DAS circuitry 614 and 620 is operating in the unmuted state.

Also, the mute function 126 can be implemented for the downlink instead of, or in addition to, for the uplink.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a repeater system for use with a base station that implements a wireless interface that makes use of control transmissions that are retransmittable, the system comprising: repeater circuitry configured to, while operating in an unmuted state, output a repeated signal at a first power level, wherein the repeated signal is an amplified version of an original signal received by the repeater system; and wherein the repeater circuitry is configured to, while operating in a muted state, one of: output the repeated signal at a power level that is less than the first power level; or not output the repeated signal; wherein the repeater system further comprises a power level detection function configured to determine a received power level of the original signal received by the repeater system; and wherein the repeater system is configured to do the following: while the repeater circuitry is operated in the muted state, transition the repeater circuitry to being operated in the unmuted state, in response to the received power level exceeding a first threshold value in connection with a first control transmission; while the repeater circuitry is operated in the unmuted state with a timer not running, start running the timer and have the repeater circuitry continue to be operated in the unmuted state, in response to the received power level falling below a second threshold value in connection with the completion of the transmission of the first control transmission; while the repeater circuitry is operated in the unmuted state with the timer running, stop the running of the timer and have the repeater circuitry continue to be operated in the unmuted state, in response to the received power level exceeding the first threshold value in connection with a subsequent control transmission; and while the repeater circuitry is operated in the unmuted state with the timer running, stop the running of the timer and transition the repeater circuitry to being operated in the muted state, in response to the timer having run for a predetermined amount of time without the received power level exceeding the first threshold value.

Example 2 includes the repeater system of Example 1, wherein the repeater circuitry comprises at least one of uplink repeater circuitry and downlink repeater circuitry.

Example 3 includes the repeater system of any of the Examples 1-2, wherein the repeater system comprises a single-node repeater.

Example 4 includes the repeater system of Example 3, wherein the single-node repeater is configured to digitally process digital samples indicative of the original signal received by the repeater system in connection with outputting the repeated signal.

Example 5 includes the repeater system of any of the Examples 3-4, wherein the single-node repeater comprises an analog single-node repeater.

Example 6 includes the repeater system of any of the Examples 1-5, wherein the repeater system comprises a distributed antenna system.

Example 7 includes the repeater system of Example 6, wherein the distributed antenna system comprises at least one of: an analog distributed antenna system and a digital distributed antenna system.

Example 8 includes the repeater system of any of the Examples 1-7, wherein the base station is shared with the repeater system and a base station antenna system co-located with the base station.

Example 9 includes the repeater system of Example 8, wherein the base station is shared with the repeater system and the base station antenna system co-located with the base station using at least one of: an RF splitter and combiner; and a donor antenna.

Example 10 includes the repeater system of any of the Examples 1-9, wherein the base station comprises at least one of: a public safety base station; a private safety base station; and a commercial wireless service base station.

Example 11 includes the repeater system of any of the Examples 1-10, wherein the wireless interface makes use of an uplink random access channel (RACH) procedure, wherein the control transmissions comprise RACH transmissions.

Example 12 includes the repeater system of Example 11, wherein the uplink random access channel procedure comprises a Long Term Evolution (LTE) random access channel procedure performed using the physical random access channel (PRACH).

Example 13 includes the repeater system of Example 12, wherein the repeater circuitry comprises uplink repeater circuitry; and wherein the repeater system is configured to do the following: while the uplink repeater circuitry is operated in the muted state, transition the uplink repeater circuitry to being operated in the unmuted state, in response to the received power level exceeding the first threshold value in connection with a first RACH transmission by an item of user equipment only if the received power level exceeds a third threshold value, wherein the third threshold value is greater than the first threshold value and is associated with an increase in transmit power of a retransmitted RACH transmission that is a part of the RACH procedure.

Example 14 includes the repeater system of any of the Examples 1-13, wherein the first threshold value and the second threshold value are one of: different values and the same value.

Example 15 includes the repeater system of any of the Examples 1-14, wherein the first threshold value differs from the second threshold value in order to account for hysteresis.

Example 16 includes a method of muting a repeater system used with a base station that implements a wireless interface that makes use of control transmissions that are retransmittable, the repeater system comprising repeater circuitry configured to, while operating in an unmuted state, output a repeated signal at a first power level, wherein the repeated signal is an amplified version of an original signal received by the repeater system and wherein the repeater circuitry is configured to, while operating in a muted state, do one of: output the repeated signal at a power level that is less than the first power level; or not output the repeated signal, wherein the repeater system is configured to determine a received power level of the original signal received by the repeater system, the method comprising: while the repeater circuitry is operated in the muted state, transitioning the repeater circuitry to being operated in the unmuted state, in response to the received power level exceeding a first threshold value in connection with a first control transmission; while the repeater circuitry is operated in the unmuted state with a timer not running, starting the running of the timer and having the repeater circuitry continue to be operated in the unmuted state, in response to the received power level falling below a second threshold value in connection with the completion of the transmission of the first control transmission; while the repeater circuitry is operated in the unmuted state with the timer running, stopping the running of the timer and having the repeater circuitry continue to be operated in the unmuted state, in response to the received power level exceeding the first threshold value in connection with a subsequent control transmission; and while the repeater circuitry is operated in the unmuted state with the timer running, stopping the running of the timer and transitioning the repeater circuitry to being operated in the muted state, in response to the timer having run for a predetermined amount of time without the received power level exceeding the first threshold value.

Example 17 includes the method of Example 16, wherein the repeater circuitry comprises at least one of uplink repeater circuitry and downlink repeater circuitry.

Example 18 includes the method of any of the Examples 16-17, wherein the repeater system comprises a single-node repeater.

Example 19 includes the method of Example 18, wherein the single-node repeater is configured to digitally process digital samples indicative of the original uplink signal received by the repeater system in connection with outputting the repeated uplink signal.

Example 20 includes the method of any of the Examples 18-19, wherein the single-node repeater comprises an analog single-node repeater.

Example 21 includes the method of any of the Examples 16-20, wherein the repeater system comprises a distributed antenna system.

Example 22 includes the method of Example 21, wherein the distributed antenna system comprises at least one of: an analog distributed antenna system and a digital distributed antenna system.

Example 23 includes the method of any of the Examples 16-22, wherein the base station is shared with the repeater system and a base station antenna system co-located with the base station.

Example 24 includes the method of Example 23, wherein the base station is shared with the repeater system and the base station antenna system co-located with the base station using at least one of: an RF splitter and combiner; and a donor antenna.

Example 25 includes the method of any of the Examples 16-24, wherein the base station comprises at least one of: a public safety base station; a private safety base station; and a commercial wireless service base station.

Example 26 includes the method of any of the Examples 16-25, wherein the wireless interface makes use of an uplink random access channel (RACH) procedure, wherein the control transmissions comprise RACH transmissions.

Example 27 includes the method of Example 26, wherein the uplink random access channel procedure comprises a Long Term Evolution (LTE) random access channel procedure performed using the physical random access channel (PRACH).

Example 28 includes the method of Example 27, wherein the repeater circuitry comprises uplink repeater circuitry; and wherein the method further comprises: while the uplink repeater circuitry is operated in the muted state, transitioning the uplink repeater circuitry to being operated in the unmuted state, in response to the received power level exceeding the first threshold value in connection with a first RACH transmission by an item of user equipment only if the received power level exceeds a third threshold value, wherein the third threshold value is greater than the first threshold value and is associated with an increase in transmit power of a retransmitted RACH transmission that is a part of the RACH procedure.

Example 29 includes the method of any of the Examples 16-28, wherein the first threshold value and the second threshold value are one of: different values and the same value.

Example 30 includes the method of any of the Examples 16-29, wherein the first threshold value differs from the second threshold value in order to account for hysteresis.

Example 31 includes a repeater system for use with a base station, the system comprising: repeater circuitry configured to, while operating in an unmuted state, output a repeated signal at a first power level, wherein the repeated signal is an amplified version of an original signal received by the repeater system; and wherein the repeater circuitry is configured to, while operating in a muted state, one of: output the repeated signal at a power level that is less than the first power level; or not output the repeated signal; wherein the repeater system further comprises a power level detection function configured to determine a received power level of a signal received by the repeater system; and wherein the repeater system is configured to do the following: while the repeater circuitry is operated in the muted state, perform a transition process for operating the repeater circuitry in the unmuted state, in response to the received power level crossing a first threshold value; and while the repeater circuitry is operated in the unmuted state, perform a transition process for operating the repeater circuitry in the muted state, in response to the received power level crossing a second threshold value.

Example 32 includes the repeater system of Example 31, wherein the transition process for operating the repeater circuitry in the unmuted state comprises at least one of: using a confirmation mechanism to confirm that the repeater circuitry should be operated in the unmuted state that causes the repeater circuitry to be operated in the unmuted state if the confirmation mechanism confirms that the repeater circuitry should be operated in the unmuted state; and operating the repeater circuitry in the unmuted state without the use of a confirmation mechanism to confirm that the repeater circuitry should be operated in the unmuted state; and wherein the transition process for operating the repeater circuitry in the muted state comprises at least one of: using a confirmation mechanism to confirm that the repeater circuitry should be operated in the muted state that causes the repeater circuitry to be operated in the muted state if the confirmation mechanism confirms that the repeater circuitry should be operated in the muted state; and operating the repeater circuitry in the muted state without the use of a confirmation mechanism to confirm that the repeater circuitry should be operated in the muted state.

Example 33 includes the repeater system of Example 32, wherein the confirmation mechanism to confirm that the repeater circuitry should be operated in the unmuted state causes the repeater circuitry to be operated in the unmuted state if a first predetermined period elapses without the received power level ever crossing the second threshold value; and wherein the confirmation mechanism to confirm that the repeater circuitry should be operated in the muted state causes the repeater circuitry to be operated in the muted state if a second predetermined period elapses without the received power level ever crossing first threshold value.

Example 34 includes the repeater system of Example 33, wherein the first and second predetermined periods are the same or different from one another.

Example 35 includes the repeater system of any of the Examples 31-34, wherein the repeater system comprises a stationary repeater; wherein the received power level is a received power level of an uplink signal received by the repeater system from user equipment; wherein the first threshold value is equal to or greater than the second threshold value; and wherein the received power level crosses the first threshold value when the received power level exceeds the first threshold value; and wherein the received power level crosses the second threshold value when the received power level falls below the second threshold value.

Example 36 includes the repeater system of any of the Examples 31-35, wherein the repeater system comprises a mobile repeater system; wherein the received power level is a received power level of a downlink signal received by the repeater system from the base station; wherein the first threshold value is equal to or less than the second threshold value; and wherein the received power level crosses the first threshold value when the received power level falls below the first threshold value; and wherein the received power level crosses the second threshold value when the received power level exceeds the second threshold value.

Example 37 includes a method of muting a repeater system used with a base station, the repeater system comprising repeater circuitry configured to, while operating in an unmuted state, output a repeated signal at a first power level, wherein the repeated signal is an amplified version of an original signal received by the repeater system and wherein the repeater circuitry is configured to, while operating in a muted state, do one of: output the repeated signal at a power level that is less than the first power level; or not output the repeated signal, wherein the repeater system is configured to determine a received power level of a signal received by the repeater system, the method comprising: while the repeater circuitry is operated in the muted state, performing a transition process for operating the repeater circuitry in the unmuted state, in response to the received power level crossing a first threshold value; and while the repeater circuitry is operated in the unmuted state, performing a transition process for operating the repeater circuitry in the muted state, in response to the received power level crossing a second threshold value.

Example 38 includes the method of Example 37, wherein the transition process for operating the repeater circuitry in the unmuted state comprises at least one of: using a confirmation mechanism to confirm that the repeater circuitry should be operated in the unmuted state that causes the repeater circuitry to be operated in the unmuted state if the confirmation mechanism confirms that the repeater circuitry should be operated in the unmuted state; and operating the repeater circuitry in the unmuted state without the use of a confirmation mechanism to confirm that the repeater circuitry should be operated in the unmuted state; and wherein the transition process for operating the repeater circuitry in the muted state comprises at least one of: using a confirmation mechanism to confirm that the repeater circuitry should be operated in the muted state that causes the repeater circuitry to be operated in the muted state if the confirmation mechanism confirms that the repeater circuitry should be operated in the muted state; and operating the repeater circuitry in the muted state without the use of a confirmation mechanism to confirm that the repeater circuitry should be operated in the muted state.

Example 39 includes the method of Example 38, wherein the confirmation mechanism to confirm that the repeater circuitry should be operated in the unmuted state causes the repeater circuitry to be operated in the unmuted state if a first predetermined period elapses without the received power level ever crossing the second threshold value; and wherein the confirmation mechanism to confirm that the repeater circuitry should be operated in the muted state causes the repeater circuitry to be operated in the muted state if a second predetermined period elapses without the received power level ever crossing first threshold value.

Example 40 includes the method of Example 39, wherein the first and second predetermined periods are the same or different from one another.

Example 41 includes the method of any of the Examples 37-40, wherein the repeater system comprises a stationary repeater system; wherein the received power level is a received power level of an uplink signal received by the repeater system from user equipment; wherein the first threshold value is equal to or greater than the second threshold value; and wherein the received power level crosses the first threshold value when the received power level exceeds the first threshold value; and wherein the received power level crosses the second threshold value when the received power level falls below the second threshold value.

Example 42 includes the method of any of the Examples 37-41, wherein the repeater system comprises a mobile repeater system; wherein the received power level is a received power level of a downlink signal received by the repeater system from the base station; wherein the first threshold value is equal to or less than the second threshold value; and wherein the received power level crosses the first threshold value when the received power level falls below the first threshold value; and wherein the received power level crosses the second threshold value when the received power level exceeds the second threshold value.

What is claimed is:

1. A repeater system for use with a base station that implements a wireless interface that makes use of control transmissions that are retransmittable, the system comprising:
    repeater circuitry configured to, while operating in an unmuted state, output a repeated signal at a first power level, wherein the repeated signal is an amplified version of an original signal received by the repeater system; and
    wherein the repeater circuitry is configured to, while operating in a muted state, one of:
        output the repeated signal at a power level that is less than the first power level; or
        not output the repeated signal;
    wherein the repeater system further comprises a mute function configured to transition the repeater circuitry among being operated in the unmuted state and being operated in the muted state;
    wherein the repeater system further comprises a power level detection function configured to determine a received power level of the original signal received by the repeater system; and
    wherein the mute function is configured to do the following:
        while the repeater circuitry is operated in the muted state, transition the repeater circuitry to being operated in the unmuted state, in response to the received power level exceeding a first threshold value in connection with a first control transmission;
        while the repeater circuitry is operated in the unmuted state with a timer not running, start running the timer and have the repeater circuitry continue to be operated in the unmuted state, in response to the received power level falling below a second threshold value in connection with the completion of the transmission of the first control transmission;
        while the repeater circuitry is operated in the unmuted state with the timer running, stop the running of the timer and have the repeater circuitry continue to be operated in the unmuted state, in response to the received power level exceeding the first threshold value in connection with a subsequent control transmission; and
        while the repeater circuitry is operated in the unmuted state with the timer running, stop the running of the timer and transition the repeater circuitry to being operated in the muted state, in response to the timer having run for a predetermined amount of time without the received power level exceeding the first threshold value.

2. The repeater system of claim 1, wherein the repeater circuitry comprises at least one of uplink repeater circuitry and downlink repeater circuitry.

3. The repeater system of claim 1, wherein the repeater system comprises a single-node repeater.

4. The repeater system of claim 3, wherein the single-node repeater is configured to digitally process digital samples indicative of the original signal received by the repeater system in connection with outputting the repeated signal.

5. The repeater system of claim 3, wherein the single-node repeater comprises an analog single-node repeater.

6. The repeater system of claim 1, wherein the repeater system comprises a distributed antenna system.

7. The repeater system of claim 6, wherein the distributed antenna system comprises at least one of: an analog distributed antenna system and a digital distributed antenna system.

8. The repeater system of claim 1, wherein the base station is shared with the repeater system and a base station antenna system co-located with the base station.

9. The repeater system of claim 8, wherein the base station is shared with the repeater system and the base station antenna system co-located with the base station using at least one of:
    an RF splitter and combiner; and
    a donor antenna.

10. The repeater system of claim 1, wherein the base station comprises at least one of:
    a public safety base station;
    a private safety base station; and
    a commercial wireless service base station.

11. The repeater system of claim 1, wherein the wireless interface makes use of an uplink random access channel (RACH) procedure, wherein the control transmissions comprise RACH transmissions.

12. The repeater system of claim 11, wherein the uplink random access channel procedure comprises a Long Term Evolution (LTE) random access channel procedure performed using the physical random access channel (PRACH).

13. The repeater system of claim 12, wherein the repeater circuitry comprises uplink repeater circuitry; and
    wherein the repeater system is configured to do the following:
        while the uplink repeater circuitry is operated in the muted state, transition the uplink repeater circuitry to being operated in the unmuted state, in response to the received power level exceeding the first threshold value in connection with a first RACH transmission by an item of user equipment only if the received power level exceeds a third threshold value, wherein the third threshold value is greater than the first threshold value and is associated with an increase in transmit power of a retransmitted RACH transmission that is a part of the RACH procedure.

14. The repeater system of claim 1, wherein the first threshold value and the second threshold value are one of: different values and the same value.

15. The repeater system of claim 1, wherein the first threshold value differs from the second threshold value in order to account for hysteresis.

16. A method of muting a repeater system used with a base station that implements a wireless interface that makes use of control transmissions that are retransmittable, the repeater system comprising repeater circuitry configured to, while operating in an unmuted state, output a repeated signal at a first power level, wherein the repeated signal is an amplified version of an original signal received by the repeater system and wherein the repeater circuitry is configured to, while operating in a muted state, do one of: output the repeated signal at a power level that is less than the first power level; or not output the repeated signal, wherein the repeater system further comprises a mute function configured to transition the repeater circuitry among being operated in the unmuted state and being operated in the muted state, wherein the repeater system is configured to determine a received power level of the original signal received by the repeater system, the method comprising:
  while the repeater circuitry is operated in the muted state, transitioning the repeater circuitry to being operated in the unmuted state, in response to the received power level exceeding a first threshold value in connection with a first control transmission;
  while the repeater circuitry is operated in the unmuted state with a timer not running, starting the running of the timer and having the repeater circuitry continue to be operated in the unmuted state, in response to the received power level falling below a second threshold value in connection with the completion of the transmission of the first control transmission;
  while the repeater circuitry is operated in the unmuted state with the timer running, stopping the running of the timer and having the repeater circuitry continue to be operated in the unmuted state, in response to the received power level exceeding the first threshold value in connection with a subsequent control transmission; and
  while the repeater circuitry is operated in the unmuted state with the timer running, stopping the running of the timer and transitioning the repeater circuitry to being operated in the muted state, in response to the timer having run for a predetermined amount of time without the received power level exceeding the first threshold value.

17. The method of claim 16, wherein the repeater circuitry comprises at least one of uplink repeater circuitry and downlink repeater circuitry.

18. The method of claim 16, wherein the repeater system comprises a single-node repeater.

19. The method of claim 18, wherein the single-node repeater is configured to digitally process digital samples indicative of the original uplink signal received by the repeater system in connection with outputting the repeated uplink signal.

20. The method of claim 18, wherein the single-node repeater comprises an analog single-node repeater.

21. The method of claim 16, wherein the repeater system comprises a distributed antenna system.

22. The method of claim 21, wherein the distributed antenna system comprises at least one of: an analog distributed antenna system and a digital distributed antenna system.

23. The method of claim 16, wherein the base station is shared with the repeater system and a base station antenna system co-located with the base station.

24. The method of claim 23, wherein the base station is shared with the repeater system and the base station antenna system co-located with the base station using at least one of:
  an RF splitter and combiner; and
  a donor antenna.

25. The method of claim 16, wherein the base station comprises at least one of:
  a public safety base station;
  a private safety base station; and
  a commercial wireless service base station.

26. The method of claim 16, wherein the wireless interface makes use of an uplink random access channel (RACH) procedure, wherein the control transmissions comprise RACH transmissions.

27. The method of claim 26, wherein the uplink random access channel procedure comprises a Long Term Evolution (LTE) random access channel procedure performed using the physical random access channel (PRACH).

28. The method of claim 27, wherein the repeater circuitry comprises uplink repeater circuitry; and
  wherein the method further comprises:
    while the uplink repeater circuitry is operated in the muted state, transitioning the uplink repeater circuitry to being operated in the unmuted state, in response to the received power level exceeding the first threshold value in connection with a first RACH transmission by an item of user equipment only if the received power level exceeds a third threshold value, wherein the third threshold value is greater than the first threshold value and is associated with an increase in transmit power of a retransmitted RACH transmission that is a part of the RACH procedure.

29. The method of claim 16, wherein the first threshold value and the second threshold value are one of: different values and the same value.

30. The method of claim 16, wherein the first threshold value differs from the second threshold value in order to account for hysteresis.

31. A repeater system for use with a base station, the system comprising:
  repeater circuitry configured to, while operating in an unmuted state, output a repeated signal at a first power level, wherein the repeated signal is an amplified version of an original signal received by the repeater system; and
  wherein the repeater circuitry is configured to, while operating in a muted state, one of:
    output the repeated signal at a power level that is less than the first power level; or
    not output the repeated signal;
  wherein the repeater system further comprises a mute function configured to transition the repeater circuitry among being operated in the unmuted state and being operated in the muted state;
  wherein the repeater system further comprises a power level detection function configured to determine a received power level of a signal received by the repeater system; and wherein the mute function is configured to do the following:
while the repeater circuitry is operated in the muted state, perform a transition process for operating the repeater circuitry in the unmuted state, in response to the received power level crossing a first threshold value; and
while the repeater circuitry is operated in the unmuted state, perform a transition process for operating the repeater circuitry in the muted state, in response to the received power level crossing a second threshold value.

32. The repeater system of claim 31, wherein the transition process for operating the repeater circuitry in the unmuted state comprises at least one of:
using a confirmation mechanism to confirm that the repeater circuitry should be operated in the unmuted state that causes the repeater circuitry to be operated in the unmuted state if the confirmation mechanism confirms that the repeater circuitry should be operated in the unmuted state; and
operating the repeater circuitry in the unmuted state without the use of a confirmation mechanism to confirm that the repeater circuitry should be operated in the unmuted state; and
wherein the transition process for operating the repeater circuitry in the muted state comprises at least one of:
using a confirmation mechanism to confirm that the repeater circuitry should be operated in the muted state that causes the repeater circuitry to be operated in the muted state if the confirmation mechanism confirms that the repeater circuitry should be operated in the muted state; and
operating the repeater circuitry in the muted state without the use of a confirmation mechanism to confirm that the repeater circuitry should be operated in the muted state.

33. The repeater system of claim 32, wherein the confirmation mechanism to confirm that the repeater circuitry should be operated in the unmuted state causes the repeater circuitry to be operated in the unmuted state if a first predetermined period elapses without the received power level ever crossing the second threshold value; and
wherein the confirmation mechanism to confirm that the repeater circuitry should be operated in the muted state causes the repeater circuitry to be operated in the muted state if a second predetermined period elapses without the received power level ever crossing first threshold value.

34. The repeater system of claim 33, wherein the first and second predetermined periods are the same or different from one another.

35. The repeater system of claim 31, wherein the repeater system comprises a stationary repeater system;
wherein the received power level is a received power level of an uplink signal received by the repeater system from user equipment;
wherein the first threshold value is equal to or greater than the second threshold value; and
wherein the received power level crosses the first threshold value when the received power level exceeds the first threshold value; and
wherein the received power level crosses the second threshold value when the received power level falls below the second threshold value.

36. The repeater system of claim 31, wherein the repeater system comprises a mobile repeater system;
wherein the received power level is a received power level of a downlink signal received by the repeater system from the base station;
wherein the first threshold value is equal to or less than the second threshold value; and
wherein the received power level crosses the first threshold value when the received power level falls below the first threshold value; and
wherein the received power level crosses the second threshold value when the received power level exceeds the second threshold value.

37. A method of muting a repeater system used with a base station, the repeater system comprising repeater circuitry configured to, while operating in an unmuted state, output a repeated signal at a first power level, wherein the repeated signal is an amplified version of an original signal received by the repeater system and wherein the repeater circuitry is configured to, while operating in a muted state, do one of: output the repeated signal at a power level that is less than the first power level; or not output the repeated signal, wherein the repeater system further comprises a mute function configured to transition the repeater circuitry among being operated in the unmuted state and being operated in the muted state, wherein the repeater system is configured to determine a received power level of a signal received by the repeater system, the method comprising:
while the repeater circuitry is operated in the muted state, performing a transition process for operating the repeater circuitry in the unmuted state, in response to the received power level crossing a first threshold value; and
while the repeater circuitry is operated in the unmuted state, performing a transition process for operating the repeater circuitry in the muted state, in response to the received power level crossing a second threshold value.

38. The method of claim 37, wherein the transition process for operating the repeater circuitry in the unmuted state comprises at least one of:
using a confirmation mechanism to confirm that the repeater circuitry should be operated in the unmuted state that causes the repeater circuitry to be operated in the unmuted state if the confirmation mechanism confirms that the repeater circuitry should be operated in the unmuted state; and
operating the repeater circuitry in the unmuted state without the use of a confirmation mechanism to confirm that the repeater circuitry should be operated in the unmuted state; and
wherein the transition process for operating the repeater circuitry in the muted state comprises at least one of:
using a confirmation mechanism to confirm that the repeater circuitry should be operated in the muted state that causes the repeater circuitry to be operated in the muted state if the confirmation mechanism confirms that the repeater circuitry should be operated in the muted state; and
operating the repeater circuitry in the muted state without the use of a confirmation mechanism to confirm that the repeater circuitry should be operated in the muted state.

39. The method of claim 38, wherein the confirmation mechanism to confirm that the repeater circuitry should be operated in the unmuted state causes the repeater circuitry to be operated in the unmuted state if a first predetermined period elapses without the received power level ever crossing the second threshold value; and wherein the confirmation mechanism to confirm that the repeater circuitry should be operated in the muted state causes the repeater circuitry to be operated in the muted state if a second predetermined period elapses without the received power level ever crossing first threshold value.

40. The method of claim 39, wherein the first and second predetermined periods are the same or different from one another.

41. The method of claim 37, wherein the repeater system comprises a stationary repeater system;
   wherein the received power level is a received power level of an uplink signal received by the repeater system from user equipment;
   wherein the first threshold value is equal to or greater than the second threshold value; and
   wherein the received power level crosses the first threshold value when the received power level exceeds the first threshold value; and
   wherein the received power level crosses the second threshold value when the received power level falls below the second threshold value.

42. The method of claim 37, wherein the repeater system comprises a mobile repeater system;
   wherein the received power level is a received power level of a downlink signal received by the repeater system from the base station;
   wherein the first threshold value is equal to or less than the second threshold value; and
   wherein the received power level crosses the first threshold value when the received power level falls below the first threshold value; and
   wherein the received power level crosses the second threshold value when the received power level exceeds the second threshold value.

* * * * *

UNITED STATES PATENT AND TRADEMARK OFFICE
CERTIFICATE OF CORRECTION

PATENT NO. : 10,742,305 B2
APPLICATION NO. : 15/947685
DATED : August 11, 2020
INVENTOR(S) : Daniel Schwab et al.

Page 1 of 1

It is certified that error appears in the above-identified patent and that said Letters Patent is hereby corrected as shown below:

On the Title Page

Item (54), replace "OUTPUT MUTING ARE ACTIVE REPEATER SYSTEMS" with --OUTPUT MUTING FOR ACTIVE REPEATER SYSTEMS--.

In the Specification

Column 1, Lines 1-2, replace the title "OUTPUT MUTING ARE ACTIVE REPEATER SYSTEMS" with --OUTPUT MUTING FOR ACTIVE REPEATER SYSTEMS--.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*